US012679545B2

(12) United States Patent
Puschmann et al.

(10) Patent No.: US 12,679,545 B2
(45) Date of Patent: Jul. 14, 2026

(54) HYDROGEN ACCUMULATION CONTROL SYSTEM FOR MONITORING AND CONTROLLING LEAKED HYDROGEN WITHIN AN INTERIOR SPACE

(71) Applicant: Airbus Operations GmbH, Hamburg (DE)

(72) Inventors: Carsten Puschmann, Hamburg (DE); Ulrich Huonker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 546 days.

(21) Appl. No.: 18/318,807

(22) Filed: May 17, 2023

(65) Prior Publication Data

US 2023/0406514 A1    Dec. 21, 2023

(30) Foreign Application Priority Data

May 20, 2022    (EP) ..................................... 22174464

(51) Int. Cl.
*B64D 13/06*          (2006.01)
*B01D 53/22*          (2006.01)
(Continued)

(52) U.S. Cl.
CPC ........... *B64D 13/06* (2013.01); *B01D 53/228* (2013.01); *B01D 71/028* (2013.01); *B64D 45/00* (2013.01);
(Continued)

(58) Field of Classification Search
CPC ...... B64D 13/06; B64D 45/00; B01D 53/228; B01D 71/028; B01D 2257/108; B01D 2259/4575
(Continued)

(56) References Cited

U.S. PATENT DOCUMENTS

| | | | |
|---|---|---|---|
| 2003/0164202 A1 | 9/2003 | Graham | |
| 2013/0288160 A1 | 10/2013 | Kurre | |
| 2023/0170504 A1* | 6/2023 | Hancock | ................. B60L 58/32 |
| | | | 429/427 |

FOREIGN PATENT DOCUMENTS

| | | |
|---|---|---|
| CN | 108758355 A | 11/2018 |
| CN | 110047169 A | 7/2019 |
| (Continued) | | |

OTHER PUBLICATIONS

Cadwallader L.C. et al., "Safety Issues with Hydrogen as a Vehicle Fuel," http://www.inel.gov/x-web/other/framed.shtmal?/energy/fossil/hydrogen/pdf/h2safetyreport.pdf Sep. 1, 1999.
(Continued)

*Primary Examiner* — Avinash A Savani
*Assistant Examiner* — Dana K Tighe
(74) *Attorney, Agent, or Firm* — KDW Firm PLLC

(57)          ABSTRACT

A hydrogen accumulation control system for monitoring and controlling leaked hydrogen within an interior space, in particular of an aircraft, includes a hydrogen detection system installed within the interior space to detect the presence of gaseous hydrogen in the interior space and to provide occurrence data on the detected hydrogen within the interior space, a system control configured to assess the occurrence data and to determine and initiate a remedial procedure for reduction of the detected hydrogen within the interior space, and a venting system configured to vent the interior space from the detected hydrogen according to the remedial procedure.

20 Claims, 9 Drawing Sheets

(51) Int. Cl.
    *B01D 71/02*         (2006.01)
    *B64D 45/00*         (2006.01)

(52) U.S. Cl.
    CPC ................. *B01D 2257/108* (2013.01); *B01D 2259/4575* (2013.01)

(58) Field of Classification Search
    USPC ........................................................ 454/75
    See application file for complete search history.

(56)              References Cited

FOREIGN PATENT DOCUMENTS

| | | |
|---|---|---|
| JP | 5192867 B2 | 5/2013 |
| WO | 2016092495 A2 | 6/2016 |

OTHER PUBLICATIONS

European Search Report for Application No. 22174464 dated Oct. 13, 2022.
European Office Action for EP Application 22174464.2, dated Apr. 3, 2025, 6 pages.

* cited by examiner

HYDROGEN ACCUMULATION CONTROL SYSTEM FOR MONITORING AND CONTROLLING LEAKED HYDROGEN WITHIN AN INTERIOR SPACE

TECHNICAL FIELD

The disclosure herein pertains to a hydrogen accumulation control system for monitoring and controlling leaked hydrogen within an interior space. The disclosure herein particularly relates to the usage of such a system in a vehicle, especially an aircraft.

BACKGROUND

Although it can be used in many applications, the disclosure herein and the problems underlying it are explained in greater detail in relation to passenger aircraft. However, the methods and devices described can likewise be used in different vehicles and in all sectors of the transport industry, e.g. for road vehicles, for rail vehicles, for watercraft or for general aircraft. The disclosure herein can be particularly applied to vehicles transporting hydrogen or using hydrogen as energy source, e.g. for direct propulsion in the engines or to generate electricity via fuel cells, which are therefore equipped with parts (e.g. pipes, valves, tanks etc.) to fuel, defuel, store and/or distribute hydrogen. Moreover, the system may also be used in other applications, e.g. in buildings containing installations, piping and/or storage items or the like for hydrogen, e.g. buildings serving as parking accommodation for aircraft or other vehicles with hydrogen tanks, e.g. a hangar for aircraft.

One approach to drive aircraft with reduced emission of carbon dioxide is the use of hydrogen, e.g. for direct propulsion in the engines and/or turbines or to generate electricity, e.g. in a fuel cell powering electric engines. This requires to take and handle hydrogen on board of aircraft including the necessary installation for fueling, defueling, storing, processing, piping and/or distributing the hydrogen (in gaseous or liquid state). At ambient pressure, hydrogen is in a gaseous state above –253° C. Liquid hydrogen vaporizes in short time under ambient conditions. As hydrogen is a very light gas, it climbs quickly upwards in case of a leakage or venting (hydrogen gas can elevate at ambient temperature between 1 m/sec and 9 m/sec). However, very high concentration ranges of leaked hydrogen in air should be avoided due to the potential risk of ignition.

If hydrogen discharge takes place in the open air, the hydrogen is soaring up and diffusing quickly into the environmental air, reducing the necessary concentration below its ignition limit. However, in closed rooms as e.g. in an aircraft, the situation is different as lost hydrogen gas may accumulate in the top areas of the room below the roof or may be cooped and hold in non-vented areas in the aircraft structure or in areas with low air-exchange or without opening at their top. Typical aircraft structure design with frames and stringers creates walled areas directed from the roof downwards, which may allow the accumulation of hydrogen at the top of these upwardly enclosed volumes. In case of higher amounts of lost hydrogen or ongoing and/or unstopped losses of hydrogen inside an aircraft, the hydrogen may accumulate and an area with high hydrogen concentration in air may grow, starting from the top areas, e.g. of an upper shell, and may then fill the aircraft or one enclosed area of it vertically in downward direction. Such hydrogen accumulations should be detected and removed quickly in consequence.

SUMMARY

Against this background, it is an object of the disclosure herein to find solutions for monitoring and controlling the accumulation of leaked hydrogen in interior spaces.

This object is achieved by a hydrogen accumulation control system and an aircraft having features disclosed herein.

According to an aspect of the disclosure herein, a hydrogen accumulation control system for monitoring and controlling leaked hydrogen within an interior space, in particular of an aircraft, comprises a hydrogen detection system installed within the interior space and configured to detect the presence of gaseous hydrogen in the interior space and to provide occurrence data on the detected hydrogen within the interior space; a system control configured to assess the occurrence data and to determine and initiate a remedial procedure for reduction of the detected hydrogen within the interior space; and a venting system configured to vent the interior space from the detected hydrogen according to the remedial procedure.

According to a further aspect of the disclosure herein, an aircraft comprises a hydrogen accumulation control system according to the disclosure herein.

Thus, one idea of the disclosure herein is to monitor dedicated areas in an aircraft for the potential occurrence of hydrogen, e.g. due to a leakage. In case hydrogen is detected, the system evaluates the situation and derives and initiates countermeasures and starts appropriate physical procedures. These actions mainly intend to reduce the risk of ignition, diminish the hydrogen concentrations below their ignition limit and dispose any leaked hydrogen from inside the closed interior, e.g. of an aircraft, to ensure safety and health for passengers, crew and maintenance staff.

The present system may detect hydrogen by direct and/or indirect measurements and collect data about locations and concentrations of hydrogen, e.g. on board of an aircraft. The system and its elements can be employed both in non-pressurized and pressurized areas in the aircraft. The system may comprise multiple specific sensor elements. The system control may comprise an analysis and processing unit, which evaluates data and determines strategies how to treat specific hydrogen events. The system may analyze physical measurements and initiate appropriate actions. Furthermore, the system may also interface with other systems in the aircraft and their elements.

The system may command other systems to use their capabilities for hydrogen leakage risk mitigation. Examples for this can be using or influencing data and their transfer, initiating, adjusting and issuing commands, triggering and steering physical devices from the other systems. All measurements and activities inside the system and in the other aircraft systems are following the target to reduce the risks and impacts caused by hydrogen accumulations in the aircraft. The system may continuously monitor data from its sensors and other systems to feed into a respective database of the system. The system may continuously analyze the data to identify hydrogen leaks and risks, taking advantage of its databases. This can encompass also data available in other systems. The system may also calculate hydrogen movement and accumulation based also on geometrical data (i.e. three-dimensional compartment information, sensor locations and other system elements of e.g. routes, pipes, elements for electrical and mechanical systems). This information may be used to evaluate and predict risk levels by also taking into account the available information in the database(s). The application and use of the databases can be static, but can also become extended to a dynamic self-learning system, which applies and improves its evaluation procedures, data interpretations and measurement calculations, based on methods of artificial intelligence as e.g. knowledge-based systems, pattern analysis and recognition on neuronal networks.

The disclosure herein offers various advantages including increased safety, in particular for vehicles like aircraft having hydrogen on board (reduced risk of fire, deflagration, explosion). Hydrogen leakages and resulting hydrogen accumulations can be treated much quicker, automatized and with clear status for crew, maintenance staff etc. about location and risk level of critical hydrogen concentrations. Based on databases and automated learning the risk level of detected hydrogen can be quickly and more precisely assessed. Operation can be continued in case of small hydrogen leakages (i.e. hydrogen concentrations due to the leakage can be kept under control). At the same time, the disclosure herein provides a reduced risk of unintended ignition by maintenance. Moreover, waiting time on ground in case of hydrogen losses on an aircraft are reduced. The current status of any hydrogen accumulation can be made available to the personnel. For example, access to areas with traces of hydrogen can be limited and/or prohibited. Consequently, personnel safety and health is ensured due to knowledge about available hydrogen concentrations, which may reduce the available oxygen for breathing, such that oxygen may be made available if needed. The system allows to launch appropriate actions quickly. In particular, manned and unmanned aircraft with hydrogen on board can use elements of this disclosure herein to ensure safe operation and flight. Elements of the disclosure herein can be applied in unpressurized areas as well as pressurized areas in aircraft.

The present hydrogen accumulation control system (HACS) comprises the following main parts: a hydrogen detection system, a system control and a venting system. These parts may be communicatively coupled with each other by a communication network (e.g. wired or wireless, via optical fibers etc.) and may be powered by a suitable power network (e.g. electrical, hydraulic and/or pneumatic). Moreover, the system may comprise an indication system having several integrated and/or standalone indication units, e.g. displays, warning lamps, indicators, loudspeakers, haptic transmitters etc. Such an indication system may be connected with other systems and receive appropriate data and commands from them via the communication network or by direct connection.

Hydrogen Detection System:

The system may comprise one or more sensor units for hydrogen gas detection. Each unit may contain a hydrogen gas sensor and a processing unit. There exist diverse hydrogen sensor types which use for detection e.g. electronic, electrochemical, chemical or optical effects. In case of detected hydrogen gas by the sensor, the processing unit evaluates the data and gives appropriate indications and messages to the HACS system control.

HACS System Control:

The HACS system control may comprise of a part for data analysis and a part for control. The system control analyzes the incoming data from the hydrogen gas detection units and calculates and decides if and which indication activities to initiate, which information to be forwarded to other systems and which measurements to reduce hydrogen accumulation are to be started. For calculations it can use also data received from other systems or databases. With the system control, elements of the HACS can be steered manually or automatized via commands, which are sent from the system control over the communication network, wireless or via direct connections to further HACS elements. The system control can be designed as stand-alone, but also together with indication units or as part of another system. The system control can be part of or combined with another steering unit e.g. in the cockpit in form of e.g. manual switches, touch panel, smart boards etc. and/or a software module. Furthermore, steering of the system control could be done remote via software application, which is running e.g. on a mobile device like a mobile Flight Attendant Panel or a mobile Maintenance Panel and which is connected via wired or wireless connection to the system control. The system control may be linked with the hydrogen gas detection units by direct connection or via the communication network. The system control can communicate with other systems to request and receive information about their state and especially the pressure status in and outside the aircraft. It sends appropriate data to the indication units and data and commands to other systems via the communication network or by direct connection.

Venting System:

The venting system for gas drainage may comprise one or more venting elements that are installed in the aircraft. They can transfer air and hydrogen from inside the aircraft to outside the aircraft directly or by forwarding it into an air extraction ductwork for air discharge. To be effective, the venting elements should be located in areas with possible hydrogen accumulation. A sucking side of a venting element may be installed in such a suitable position that remaining hydrogen is ascending automatically in direction of the sucking zone of the respective venting element. Continuous sucking and extracting of air-hydrogen mix through the venting elements supports their replenishing and secures that new hydrogen gases are moved towards the sucking side of the respective venting element. This will allow to empty local hydrogen accumulations completely or at least below a certain hydrogen concentration level.

Advantageous embodiments and improvements of the disclosure herein are disclosed herein.

According to an embodiment of the disclosure herein, the occurrence data characterize a distribution and/or a concentration of the detected hydrogen.

It is to be understood that in particularly simple embodiments of the disclosure herein, each sensor unit may merely indicate the presence of hydrogen without any additional specifics about its (potentially time-dependent) distribution, concentration and/or flow/movement characteristics. To this end, the sensor units may determine whether hydrogen is detected in an amount above a predefined threshold.

In other embodiments however, the detection system may provide more or less extensive information on spatial and/or time dependent distribution, concentration and/or flow of hydrogen within the interior space.

According to an embodiment of the disclosure herein, the venting system may comprise at least one ventilator configured to induce a directed air flow to achieve distribution of the hydrogen within the interior space, reduction of a hydrogen concentration within the interior space and/or discharge of the hydrogen from the interior space.

For example, there can be one or more ventilators inside a venting element. Ventilators can be positioned flexible in the passage between inlet and outlet side of the venting element or inside the duct(s) leading through an air extraction network. A ventilator captures air on its inflow side and accelerates and compresses it towards its outflow side. This generates a directed airflow and a negative pressure difference between inflow and outflow side. Optionally a ventilator can be steered in power and rotational speed and therefore may allow to control and modulate the throughput of sucked air-hydrogen mix. Each ventilator may be linked directly with the system control or via the communication network. It can send status about the data from its sensors, failures etc. and adjust its motor behavior in accordance to the commands received from the system control. Technical implementations for ventilators are e.g. axial or centrifugal fans or turbines. In case of multiple inlets on sucking side of the respective venting element, each inlet can have its own ventilator to steer individually the sucking of air-hydrogen mix. Other ventilator installations are also possible, e.g. one central ventilator in the central junction for multiple inlets or one ventilator in the main inlet duct after all of the multiple inlets have joined it (in flow direction).

Another application of ventilators is their positioning outside of a venting element or air extraction tube. Such a ventilator can be used to generate a directed airflow for pushing air from one interior area to another. The control and steering of such ventilators (i.e. amount, velocity and direction of generated air flow) can be managed by the system control in similar manner.

However, it is to be understood, that there exists also the possibility to design venting elements or an extraction network without the use of ventilators or equivalent means like nozzles, jets etc. In this case the necessary flow of the air-hydrogen mix to extract overboard may be driven solely by the given positive pressure difference from inside to outside the aircraft. This pressure difference can be built up on one side by the given air pressure outside the aircraft, especially at low outside pressure level in higher flight altitudes and on the other side by the actually existent cabin pressure, which must be higher than the outside pressure. The pressure difference can be supported or even increased by reducing/stopping air discharge from the pressurized air inside the aircraft, e.g. via a cabin pressure control system, and by increasing the air inflow through an air conditioning system into the aircraft. If possible for the air conditioning system, dedicated air inflows can be directed into specific pressurized or unpressurized areas to efficiently sustain overpressure in those areas which need to be vented under priority.

The at least one ventilator may be particularly configured to steer the directed air flow such that the hydrogen accumulates in an upper portion of the interior space, from where it can be discharged, by separation from the air transported with the directed air flow.

As hydrogen is lighter than air, it tends to ascend quickly within an interior space, and any surplus of normal air caused by blowing may return by flowing back on a lower elevation within the interior space. The hydrogen may thus separate itself from the normal air and accumulate in form of a hydrogen cloud in the upper portion of the interior space, e.g. an upper aft area of an aircraft. From this upper accumulation portion it may then be discharged, e.g. by hydrogen outlets of the venting system.

According to an embodiment of the disclosure herein, the venting system may comprise at least one venting element from the group comprising a hydrogen inlet, a transfer duct, a flow control valve, a hydrogen outlet and a hydrogen flashback arrestor.

Venting Elements Thus Comprise without Limitation:
Hydrogen Inlets:

One or more hydrogen inlets on the sucking side. Each inlet can be designed as (widened) opening, optionally covered with a mesh or textile to hinder clogging or blockage by debris or impurities. The opening can be optionally elongated in form of a duct. Designs with more than one inlet for one venting element are possible. In this case, the diverse inlets are conducted, if necessary with the help of transfer ducts, and unified in one central junction or in consecutive junctions which merge single inlet(s) or their prolongation in form of ducts with the main inlet duct. The opening side of each inlet can be directed downwards to automatically catch climbing hydrogen or the respective inlet can be positioned on top or proxy to the top of an enclosed area, where hydrogen will accumulate and concentrate by edging out ambient air.

Transfer Ducts:

One or more transfer ducts can be used to bridge distances between the single parts of the venting elements to transport air-hydrogen mix on the way from inside to outside of the aircraft. For the transfer ducts and all other duct elements as well, which are used to transport hydrogen gas, it is beneficial to have an ascending installation in flow direction, as hydrogen will automatically climb upwards inside the duct also in longitudinal direction. Installations with descending ducts need to have a gas flow velocity inside which is high enough to suppress backflow of upwardly climbing hydrogen gas. This can be reached e.g. by forced ventilation in the duct or a sufficient positive pressure difference between inflow and outflow side of the duct.

Flow Control Valves:

One or more valves to open and close the passage through the venting elements may be provided. There may be at least one valve inside each venting element. The position of the valve may be located between inlet and outlet side of the venting element and can open and close a part of or the full duct cross section of the inlet or transfer duct or outlet, which all of them serve as passage for the air-hydrogen mix through the venting element. Its design can be similar to outflow valves used in cabin pressure control systems. The valve can be controlled and steered (e.g. to get status about and inducing to semi-open or fully open or close or to interlock) by e.g. mechanical, electro-mechanical or electro-magnetic or electro-static or thermally driven actuators. It can be steered by e.g. electrical signals by wire, optical data transfer by fibers or wireless by electromagnetic or light waves. It can be linked directly with the system control or may be connected with the communication network. In case of installed valves at an inlet side with more than one inlet, each inlet can be equipped with an own valve to be capable to open/close specific routes or together all inflow routes. In case of installed valves on the outlet side or at an air extraction ductwork, each individual outlet can be equipped with its own valve in a similar way.

Hydrogen Outlets:

One or several outlets to discharge sucked air and hydrogen may be provided. If a venting element is connected to an air extraction network, the outlet of the venting element has only to connect both modules in an airtight manner, for which in most situations a duct will be sufficient. In case the venting element leads for discharge to areas inside the aircraft (e.g. unpressurized areas like rear fuselage), the design of the outlet as a (widening) duct is sufficient, optionally shielded with a mesh or textile to stop ingress, debris, animals and so on.

Outlets can be also positioned with their opening directly ending at the outer aircraft skin to overboard the air-hydrogen flow, optionally shielded with a mesh or textile. Open outlets can cause-together with the air flow and wind pressure around the aircraft turbulences—backflows and negative drag effects especially in flight. This can be reduced/avoided by a slide which follows the outer shape of the aircraft and which is electrically or mechanically actuated and steered to open or close or interlock the outlet opening. The actuator for the slide may be linked with the system control directly or via the communication network. It can send status about open/semi-open/closed/locked position, failures etc. and opens/closes/locks in accordance to the commands received from the system control. The outlet can be designed as one assembly together with the valve or replacing it by taking over the function of the valve.

Optionally an air extraction ductwork may be provided, e.g. as part of the venting element(s) or as a separate installation to which the venting element(s) can be connected to with their outlet side. The air extraction ductwork may collect air and hydrogen for discharge from one or several venting elements (or other sources of air which needs to be extracted) and leads it through ducts to one or several discharge outlets where the air-hydrogen mix is dumped outside the aircraft.

Hydrogen Flashback Arrestor:

An air-hydrogen mix that is discharged overboard can be ignited outside the aircraft (e.g. by electrostatic discharge, lightning strike). There is a risk of a flashback of burning hydrogen through the venting element inside the aircraft and an ignition of accumulated hydrogen inside the aircraft in consequence. This can be avoided by a flashback arrestor which stops the hydrogen flame. Such a flashback arrestor can be installed in the outlet area or somewhere inside the passage track, which usually drains the air-hydrogen mix overboard. Possible designs for flame arrestors are using e.g. a locally narrowing pipe diameter and/or metal foams or a narrow mesh where the air-hydrogen flow of the venting element is led through. By this a flame from outside is cooled down and extinguished at this resistance element. Optionally, temperature and/or pressure sensors proxy to the resistance element can indicate a flame from outside and trigger via e.g. an electric signal by direct wire or network to the system control or the valve(s) directly to close (and interlock) the valve(s).

According to an embodiment of the disclosure herein, the interior space may comprise an accumulation portion, in particular a ceiling portion, arranged and configured for hydrogen accumulation.

The hydrogen may be collected in these particular portions of the interior space, e.g. due to the geometric particulars of the interior space, and may be vented from there in a suitable vein by the venting system.

According to an embodiment of the disclosure herein, the accumulation portion may be configured as a hydrogen inlet of the venting system.

Hence, instead of a specific inlet, every free-formed, upwardly closed space can be used. For this, the space may have a hole in its top area, which may be the entrance into a transfer duct.

According to an embodiment of the disclosure herein, the accumulation portion may be separated from the rest of the interior space by a unidirectional diaphragm, in particular a molecular sieve, allowing hydrogen to pass upwards from the interior space into the accumulation portion but not downwards from the accumulation portion back into the rest of the interior space.

To efficiently catch hydrogen and collect it in a calmed, wind-sheltered room, either form of downwardly directed inlet or space can be equipped in its lower area with a transversally installed permeable cover (e.g. in form of mesh, textile, foam), which works like a unidirectional diaphragm. As hydrogen climbs upwards, it will pass the diaphragm and accumulates in the top area of the inlet or space. The diaphragm can for example be a molecular sieve, which allows the passage of molecules below specific dimensions only. This allows to concentrate preferably hydrogen by the molecular sieve as hydrogen molecules are smaller than all other gas molecules in air. In consequence the diaphragm hinders air disturbances around to blow hydrogen out of the inlet again.

According to an embodiment of the disclosure herein, the system control may be configured to calculate accumulation and movement of the hydrogen based on the occurrence data and on geometrical data characterizing the interior space.

This system may thus calculate hydrogen movement and accumulation based on geometrical data, e.g. three-dimensional compartment information, sensor locations and other system elements of e.g. routes, pipes, elements for electrical and mechanical systems.

According to an embodiment of the disclosure herein, the system control may be configured to evaluate and predict risk levels based on the calculated hydrogen accumulation and movement, the risk levels being considered for the remedial procedure.

The information acquired by the system control can thus be used to evaluate and predict risk levels by also taking into account the available information such as geometrical data, which may be stored in suitable database(s).

The application and use of the databases can be static, but can also become extended to a dynamic self-learning system, which applies and improves its evaluation procedures, data interpretations and measurement calculations, based on methods of artificial intelligence as e.g. knowledge-based systems, pattern analysis and recognition on neuronal networks.

According to an embodiment of the disclosure herein, the system may further comprise an inert gas reservoir storing an inert gas, in particular helium. The system control may be configured to release the inert gas from the inert gas reservoir as part of the remedial procedure such that the inert gas is mixed with the hydrogen within the interior space.

The inert gas can thus be used to selectively and/or locally reduce the concentration levels of leaked hydrogen below an unproblematic level.

According to an embodiment of the disclosure herein, the venting system may be part of and/or coupled to an air conditioning system. The system control may be configured to control the air conditioning system according to the remedial procedure, in particular to transport the hydrogen at least through portions of the air conditioning system.

The air conditioning part for air distribution may comprise a network of tubes and pipes (ductwork) to transport fresh or pressurized or conditioned air from sources (e.g. air inlet, inflow valves, ram air inflow, bleed air inflow, compressed cold air with possible treatment of the inflow air in e.g. mixer units or heat transfer units to adapt pressure, temperature and humidity in the following air generation system or environmental control system) to sinks (mainly air outlets in cabin and cargo areas or individual air blowing into specific (electronic) boxes or dedicated areas for cooling/venting). The air flow can be induced and directed by e.g. the pressure difference between source and sink side, dedicated ventilation, compressors, air turbines etc. The outflow can be steered specifically by valves along the ductwork and at dedicated air outlets, piccolo tubes or other diffusors (e.g. based on permeable textile) as well. The air conditioning and distribution system can influence cabin air pressure from input side view by the amount and pressure of air brought into the aircraft. Often, the air conditioning and distribution system is connected or works closely together with a cabin pressure control system to harmonize inflow and outflow of air and further air parameters as pressure, humidity, temperature and fresh air exchange rates.

For air extraction a ductwork is installed which extracts air through air inlets from inside the aircraft. To actively suck air around an inlet, the inlet may be equipped with a ventilator with flow direction into the extraction duct. A passive air extraction works by maintaining a pressure in the extraction duct which is lower than the surrounding area outside the extraction duct. The sucked air may later be treated and mixed in further elements of the air conditioning system (e.g. mixer unit) or discharged over board.

According to an embodiment of the disclosure herein, the air conditioning system may comprise a hydrogen gas separator configured to separate hydrogen from air transported through the air conditioning system.

In case hydrogen is sucked into the air extraction ductwork, the air conditioning system has to ensure that this hydrogen cannot cross over inside the air regeneration modules or the air mixer unit into the air distribution system and will then flow back into the aircraft again. Here a gas separator installed before the air extraction ductwork enters into an air generation equipment or an air mixer can remove most of the hydrogen share of the extracted air flow. A simplistic design of a hydrogen gas separator comprises a vertical cylinder with closed bottom and a domed top with venting element in its upper area. Instead of a cylinder every other three-dimensional enclosed space with enough vertical extent can be used. An air inflow duct comes from one side in the middle of the cylinder and goes inside the cylinder in the form of a piccolo tube that the incoming air can exit smoothly to all sides, an air outflow duct may be installed on the opposite side of the cylinder and below the inflow duct. A permeable diaphragm may exist between venting element and incoming duct and a second diaphragm between incoming and outflow duct. The diaphragm can comprise e.g. mesh, textile or foam. The upper diaphragm can be made based on molecular sieve, which can enable that mainly hydrogen molecules can pass the diaphragm. When hydrogen enters the cylinder it will quickly climb upwards through the upper diaphragm towards the venting element. In case of air turbulence, the lower diaphragm hinders that hydrogen is blown directly towards the opening of the outflow duct. When hydrogen is detected in the dome area, the venting element opens and discharges the accumulated hydrogen there.

According to an embodiment of the disclosure herein, the system control may be communicatively coupled with and/or configured to control a cabin pressure control system, an aircraft door control and monitoring system, an oxygen system, an aircraft electric system and/or a flight control system in order to initiate and conduct the remedial procedure.

Cabin Pressure Control System (CPCS):

The system controls and regulates the air pressure in the pressurized area(s), mainly for cabin and cargo in the aircraft. In general, it consists of a processing unit, outflow valve(s) and sensing elements to determine pressure inside the pressurized area(s) and static atmospheric pressure outside the aircraft. Furthermore, valves between the controlled areas (e.g. between cabin and cargo) could also be part of the system to harmonize their pressures. The CPCS can be linked to or be part of other air conditioning systems. Pressures in the controlled areas are regulated by varying the opening of the outflow valve. Optionally, to protect the fuselage from over- or under-pressure in case of a failed outflow valve, a negative pressure relief valve can regulate an ingress of air into the aircraft and a positive pressure relief valve can take over the discharge of air overboard.

Door Control and Monitoring System (DCMS):

The system monitors, actuates and locks the internal and external doors, hatches and slides of the aircraft in the pressurized and unpressurized areas. It also monitors and indicates residual pressure difference between in- and outside of the aircraft to prevent unintended opening of a door which could lead to a dangerous blast of air. It inhibits pressurization of the aircraft in case of doors not in secured position/doors not correctly closed. By keeping doors/hatches/slides closed it supports to keep the air pressure inside the aircraft. It mainly consists of proximity sensors at the doors, hatches and slides to monitor their status, also an (autonomous) power supply and processing unit to evaluate data and initiate actuations and lockings via network or by direct connection. Further it includes differential pressure switches to detect and indicate pressure difference between in- and outside of the aircraft. The system interacts via network with other systems, e.g. the CPCS to control the pressure in the aircraft and to ensure safety by controlled opening or closing of the doors, hatches and slides.

Flight Control System (FCS):

The system controls and steers movable surfaces of the aircraft by which the position, angles and motion of the aircraft can be influenced. Main components are the elevators, ailerons and rudders. With the elevators the aircraft can be turned around its transverse axis. The ailerons and partially the rudders are to turn around the longitudinal axis. The rudders and partially the ailerons are for turning around the vertical axis. Secondary elements of the FCS to influence position, angles and flight direction are mainly spoilers, flaps, slats and air brakes. The system is managed and steered by the pilot, but is often equipped with own control units which adjust and manage the steering of movable surfaces on their own to support the pilot or to stabilize and improve flight maneuvers. The movable surfaces can be steered manually by the pilot via mechanical, hydro-mechanical or electric actuators. Instead, an electronic interface (fly-by-wire) between pilot and FCS can replace the manual steering by transforming the movement of the pilot steering into electric or electronic signals. These signals are then interpreted by a FCS system control unit and appropriate steering commands calculated and transferred via a network to the corresponding actuators of the FCS.

Aircraft Electric System:

Electric elements monitored and/or controlled by such a system comprise e.g. wires, cables, connectors, relays, power switches, power conversion modules, transformers, batteries, electronic circuits, electric actuators, electronic control units, power distribution modules, load and power supply and management modules, power network controllers, etc. Their main function is to ensure the proper transfer, conversion and control of electric energy and electric signals from suppliers to consumers.

As a general design rule for all system elements installed in areas with possible hydrogen accumulation, in order to avoid possible ignition of hydrogen, the electronic components (e.g. motors, switches, plugs) may be designed inside a gas-proof envelope which also dissipates thermal hot spots. Furthermore, the surface of all elements may consist of antistatic materials.

Oxygen System:

The oxygen system comprises oxygen reservoirs which are connected by tubes and/or pipes with oxygen masks. The oxygen reservoirs are usually designed as pressurized bottles or are based on chemical substances which generate oxygen after starting a chemical reaction. The masks can be encapsulated in a box, which are unlocked to release their mask(s) inside in case of need. Valves between reservoirs and masks are steering the flow of oxygen to the masks and the control unit(s) of the oxygen system manages the reservoirs, boxes and valves. Oxygen system control unit(s) may be linked via a network with other systems, e.g. the air conditioning system or the CPCS to supervise the cabin pressure in the aircraft and to provide oxygen and masks to the passengers and crew in emergency case as e.g. sudden pressure loss.

According to an embodiment of the disclosure herein, the system may further comprise an indication system configured to indicate information about the occurrence data and/or the remedial procedure.

The system may comprise several indication units that can be designed as stand-alone but also as part of other systems. Possible manifestations are e.g. optical via electronic displays, beamer, lights, warning lamps and acoustic signal items like loudspeakers or sirens installed in the aircraft, especially in the cockpit, but also outside the aircraft. A haptic indication by a vibrating alarm mechanism can be implemented as well. Moreover optical, acoustical and haptic indication via mobile optical and electronic devices with indication lights or displays or loudspeakers, head-up displays, smart glasses, headsets etc. for e.g. flight attendance or maintenance personnel are possible. The indication units may be connected with other systems and may receive appropriate data and commands from them via the communication network or by direct connection.

The disclosure herein will be explained in greater detail with reference to example embodiments depicted in the drawings as appended.

BRIEF DESCRIPTION OF THE DRAWINGS

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Figure 1:
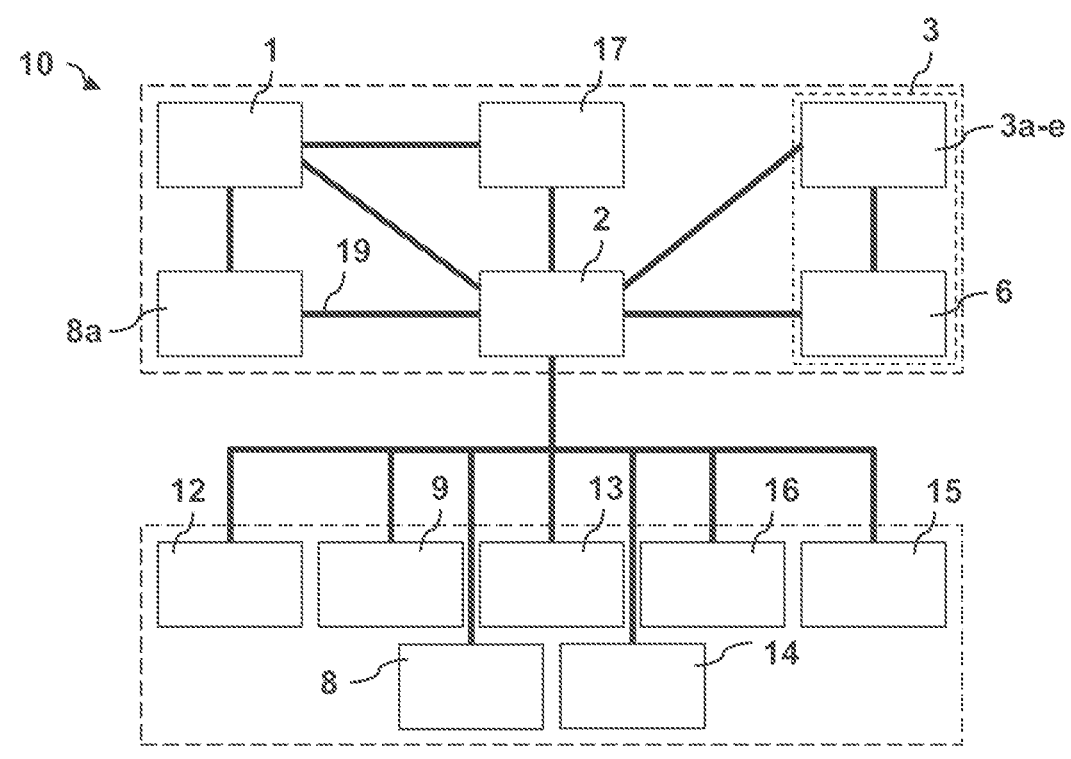
FIG. 1 shows a schematic view of a hydrogen accumulation control system according to an embodiment of the disclosure herein for monitoring and controlling leaked hydrogen within an interior space.
Figure 2:
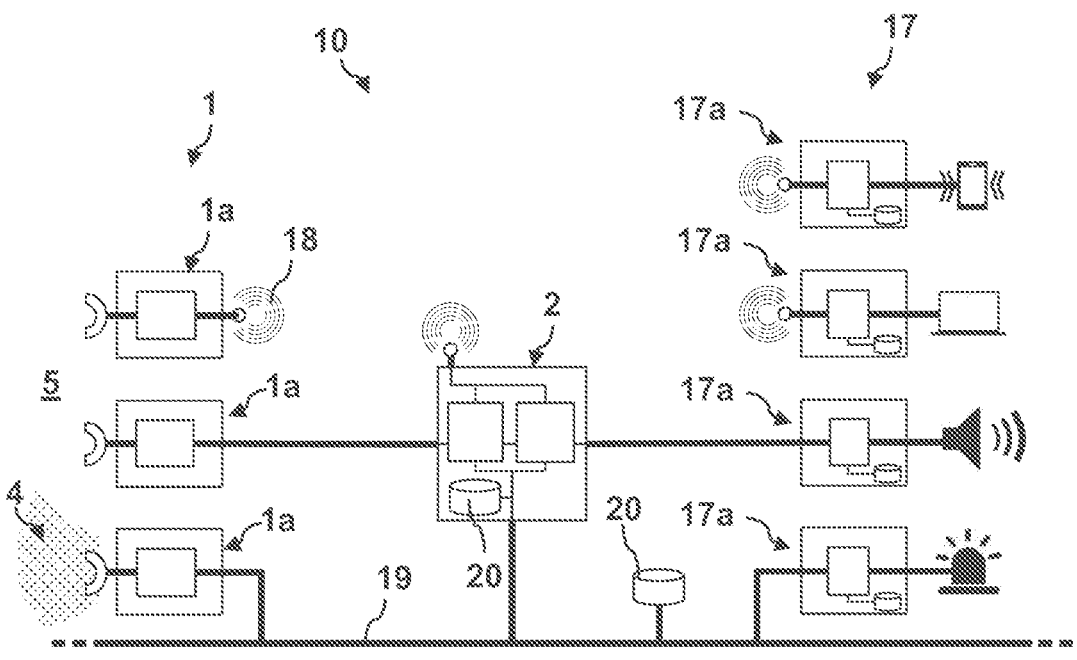
FIG. 2 shows another view of components of the system of FIG. 1.

FIGS. 1 and 2 are schematic views of a hydrogen accumulation control system (HACS) 10 according to an embodiment of the disclosure herein for monitoring and controlling leaked hydrogen 4 within an interior space 5 of an aircraft 100. FIGS. 3 to 10 show various examples of aircrafts 100 employing embodiments of such a system 10.

The HACS 10 comprises a hydrogen detection system 1 installed within the interior space 5 and configured to detect the presence of gaseous hydrogen 4 in the interior space 5 and to provide occurrence data on the detected hydrogen 4 characterizing a distribution and/or a concentration of the detected hydrogen 4 within the interior space 5.

One or more sensors units 1a for hydrogen gas detection are installed in the aircraft 100 as part of the hydrogen detection system 1. The sensors units 1a check surrounding air against hydrogen content. They can measure e.g. in continuous or interval mode, on request or at given intervals. To receive useful measurement results, they can be positioned where a hydrogen accumulation is possible by given physical geometries and gas flow from hydrogen sources. Computer simulations and physical tests for gaseous hydrogen flow through the aircraft 100 from diverse starting points can optimize the position of the gas detection units.

The HACS 10 further comprises a system control 2 configured to assess the occurrence data and to determine and initiate a remedial procedure for reduction of the detected hydrogen 4 within the interior space 5. The system control 2 may comprise a system database 20 and/or may be communicatively coupled to it. The system control 2 is configured to calculate accumulation and movement of the hydrogen 4 based on the occurrence data and on geometrical data characterizing the interior space 5. On this basis the system control 2 is able to evaluate and predict risk levels, which are considered for the remedial procedure.

The HACS 10 further comprises an indication system 17 configured to indicate information about the occurrence data and/or the remedial procedure. To this end, the indication system 17 may comprise several indication units 17a (as exemplarily shown in FIG. 2) like displays, loudspeakers, warning lights and/or vibrating alarms, for example.

In case of perceived hydrogen concentration, the sensors units 1a send this information, and also the detected hydrogen concentration if available and necessary, to the system control 2 and/or the indication system 17. In case of the information is collected by the system control 2, the system control 2 evaluates the received data and decides by internal logics and calculations the level of alarm and sends via the network commands to the indication units 17a what and how they should indicate. The indication units 17a receive the message and indicate it with the requested means (normally optical, acoustical, vibration). The design of the indication units 17a can be such that they can indicate information based on data received directly from the sensors units 1a or after evaluating received data by own processing capabilities, i.e. without the need of a specific request or command from the system control 2.

The HACS 10 further comprises a venting system 3 configured to vent the interior space 5 from the detected hydrogen 4 according to the remedial procedure.

The venting system 3 may for example comprise several ventilators 6 configured to induce a directed air flow to distribute the hydrogen 4 within the interior space 5, to reduce a hydrogen concentration within the interior space 5 and/or to discharge the hydrogen 4 from the interior space 5.

Moreover, the venting system 3 may comprise a plurality of venting elements comprising amongst others hydrogen inlets 3a, transfer ducts 3b, flow control valves 3c, hydrogen outlets 3d and/or hydrogen flashback arrestors 3e.

The venting system 3 may be part of and/or coupled to an air conditioning system 9, which controlled by the system control 2 according to the remedial procedure, in particular to transport the hydrogen 4 at least through portions of the air conditioning system 9.

Figure 3:
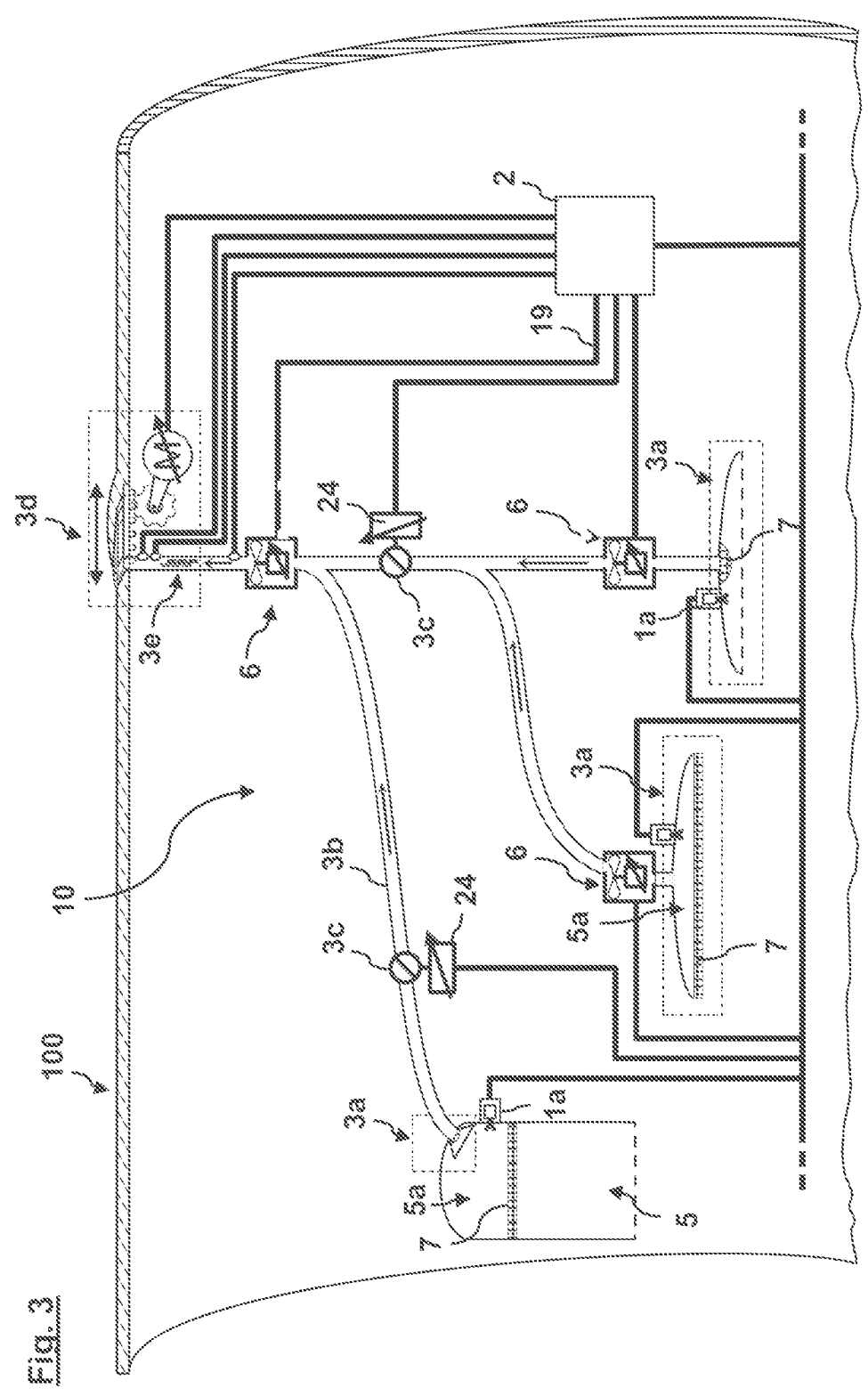
FIG. 3 shows a schematic sectional side view of an aircraft equipped with an embodiment of the system of FIG. 1.

The interior space 5 may comprises an accumulation portion 5a, in particular a ceiling portion, arranged and configured for hydrogen accumulation, which is configured as a hydrogen inlet 3a of the venting system 3 (cf. e.g. FIG. 3, middle and right inlets 3a).

The accumulation portion 5a may be separated from the rest of the interior space 5 by a unidirectional diaphragm 7, in particular a molecular sieve, allowing hydrogen 4 to pass upwards from the interior space 5 into the accumulation portion 5a but not downwards from the accumulation portion 5a back into the rest of the interior space 5 (cf. e.g. FIG. 3, left inlet 3a).

Venting (Cf. FIG. 3 in Particular):

In state of non-venting, normally the valve(s) 3c and optional outlet slide(s) 3d of the venting system 3 are in closed or locked position and the ventilator(s) 6 are not powered. This can be the standard setting for situations where no hydrogen 4 is detected. Start of venting can be initiated by commands received by the venting system 3 from the system control 2 or by direct connection to a sensor unit 1a. As precaution, preparation for start of venting (e.g. unlocking) or continuous venting can be initiated in case of e.g. fueling or de-fueling hydrogen 4 or maintenance.

After detection of hydrogen 4 by one or more sensor units 1a, the available information about this and (if available) the found hydrogen gas concentration is forwarded to the system control 2. There it is evaluated and appropriate physical measurements are calculated and sent or initiated in form of commands, electric/optical signals or by switched-on electric power to the venting system 3. Such commands can also be initiated manually or automatically by the system control 2. The venting system 3 will then unlock and open its outlet slides 3d and valve(s) 3c and start its ventilator(s) 6, if available and requested.

Depending on which of the sensor units 1a sends an alert about found hydrogen 4, the sensor control 2 or the venting system 3 can evaluate and trigger which physical activities are made for each part inside the venting system 3 specifically.

Example 1

The venting system 3 comprises several inlets 3a. Several units 1a for hydrogen gas detection are installed as well. Each of the hydrogen gas detection units 1a can detect hydrogen 4 in a specific area which will be mainly in the reach of one or a few specific inlets 3a for sucking. In case of detected hydrogen 4 at one or only a few sensor units 1a, the system control 2 opens only those valves 3c and corresponding ventilators 6 of the sucking elements at which hydrogen 4 is detected. By this, the full capacity and performance of the venting system 3 is concentrated on those inlets 3a where an air-hydrogen mix occurs and the available pressure drop at this inlet 3a of the venting system 3 is not jeopardized by inflows into other inlets of the venting system 3 without hydrogen 4 in front of them.

Fine tuning of the flow passing through the venting system 3 with its inlets 3a, valves 3c and ventilators 6 is possible e.g. by steering the opening width of the valve(s) 3c and the power and rotational speed of the ventilator(s) 6. This can be steered and controlled individually per inlet 3a (with its valve 3c and ventilator 6) by the system control 2 and can be adjusted in dependence of e.g. the detected hydrogen concentration at the diverse hydrogen gas sensor units 1a, the pressure difference between inside and outside the aircraft 100, the individual geometric dimension and volume of the catchment area for each inlet 3a or the level of danger for ignition in an area.

Example 2

A minimal venting installation can consist of an outlet slide 3d with its corresponding actuator and locking mechanisms to open, close and lock it and the therefore necessary power and network connections for controlling and steering by the HACS sensor control 2.

In case the system consists of several venting portions with respective venting elements, the individual venting portions can be controlled and steered in the same manner as explained above. A coordinated steering and control for all venting portions together can increase the efficiency of the whole venting system 3. The system control 2 can determine local occurrences of hydrogen concentrations, analyze them and determine the best strategy how to reduce the local risks and also the total risk for the whole aircraft by a specific steering of all venting elements. The system control 2 can balance between multiple parameters (e.g. detected hydrogen concentrations, pressure difference between inside and outside the aircraft 100, individual geometric dimensions and volumes of the catchment area for each inlet 3a, the level of danger for ignition in an area) to determine the most efficient sequence of physical activities for bringing the hydrogen concentration down to an uncritical level.

Example 3

Occurrence of hydrogen concentration above a defined/critical/ignition level in an area with hydrogen detection. After detection of hydrogen in an area by at least one hydrogen sensor unit 1a, this hydrogen sensor unit 1a sends appropriate signals to the system control 2. Depending on several parameters as e.g. the detected hydrogen concentration and optionally its hydrogen concentration growth, the available pressure difference and/or the criticality of the impacted area, now the system control 2 calculates appropriate measurements to reduce the hydrogen concentration in that area and initiates and/or steers physical actions of the corresponding venting element(s) with its/their catchment area where hydrogen 4 is detected. For this it can steer the opening of the valve(s) 3*a* and outlet(s) 3*d* and optionally starts their corresponding ventilators 6. After the hydrogen concentration in the affected area has fallen below a defined value, the system control 2 can then stop further venting by closing the valve(s) 3*a* and outlet(s) 3*d* and stop the ventilator(s) 6.

Example 4

Occurrence and detection of hydrogen concentration above a defined/critical/ignition level in one area and in parallel several other areas with hydrogen concentration below ignition level. In this case the system control 2 can open the relevant inlets 3*a* with their catchment areas where hydrogen concentration is above ignition level (and optionally can start corresponding ventilators 6), while the inlets 2*a* in all other areas remain closed or become closed. This will maximize the suction airflow from the most critical area by minimal jeopardizing the available pressure difference which drives the airflow from inboard the aircraft 100 through the available venting elements to outboards. After the hydrogen concentration in this area has fallen below a defined/critical value, the system control 2 can then open the inlets 2*a* in the next critical area(s) to reduce the hydrogen concentration there.

Example 5

Detection of ongoing increase of hydrogen concentration in an area in the aircraft 100 without ignition sources inside, during fueling procedure (i.e. no available pressure difference between inboard and outboard, impacted area is non-critical). Root cause of such a local increase could be a single leak in the installed hydrogen system or a failure made during fueling. A steep increase indicates the potential that a lot of further hydrogen 4 can come. The uncritical area can be used as local buffer/storage to catch the further hydrogen inflow, while the areas around can be prepared for or starting already venting. An appropriate strategy for the system control 2 can be to open only those inlets 3*a* and start respective ventilators 6 with catchment area in that areas which will at first receive the overflow from the uncritical area after capacity exceed. This prepares and concentrates the available venting performance (e.g. by ventilators 6, available pressure difference, max possible venting flow rate) and gains time to start further activities as e.g. to open all doors or to stop fueling.

Figure 5:
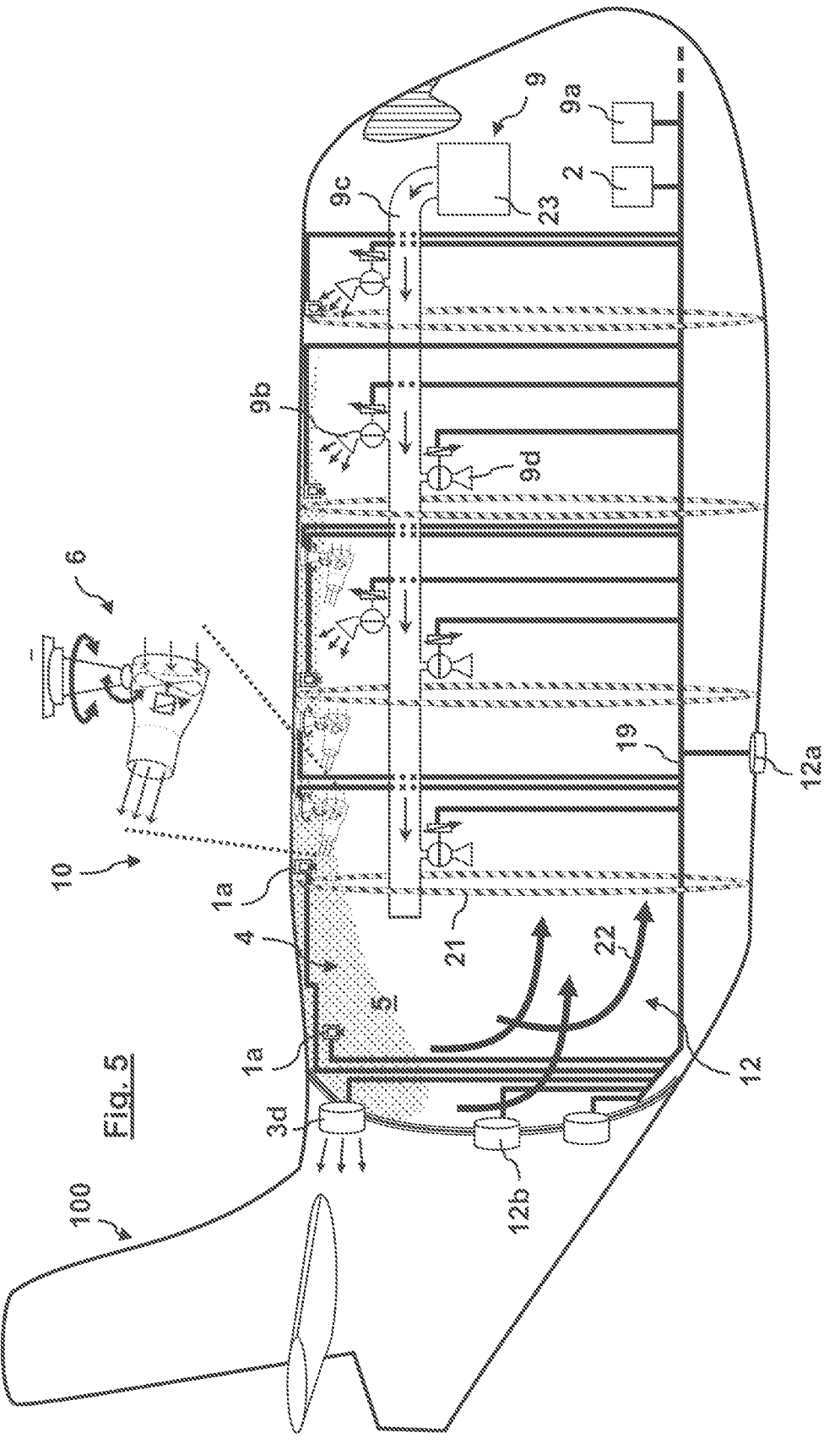
FIG. 5 shows another schematic sectional side view of an aircraft equipped with an embodiment of the system of FIG. 1.

Blowing (Cf. FIG. 5 in Particular):

If not vented, hydrogen gas elevates quickly upwards in the aircraft 100 until it is captured by enclosed rooms or is stopped inside by the roof of the aircraft 100 upper shell. Aircraft built with frames and stringers or similar structural components 21 below the roof have walled and locally enclosed areas in downwards direction. Hydrogen 4 can accumulate in this mesh of walls. In case one of these segments has been filled up with hydrogen 4, ongoing hydrogen 4 inflow will pour first to the next mesh segments proxy to it which are at higher or at similar height. Further inflow of hydrogen 4 will lead to a hydrogen accumulation starting from the top areas in the upper shell and continues to fill the whole aircraft 100 vertically downwards. Without further disturbances the mix of hydrogen 4 and normal air will come to an equilibrium with the highest hydrogen concentration in the air in its highest areas, diminishing in downwards direction.

Horizontal air blow against accumulated hydrogen 4 or directed air blow into a segment containing hydrogen 4 will push some of the hydrogen 4 aside to the segments around. If neighbored segments in blowing direction have a low hydrogen concentration, the blown hydrogen 4 will remain and accumulate in this/these segment(s). Stronger and ongoing blowing will move hydrogen 4 from one segment to its neighbored segments in blowing direction. Ongoing blowing can move hydrogen 4 stepwise from one enclosed area to the next one. If the blowing stops, due to its rapid elevation behavior the hydrogen 4 will quickly dissipate again and re-establish a vertically even hydrogen concentration inside its downwardly enclosed room. Steady blowing can maintain a horizontally imbalanced hydrogen concentration inside its local segments. Example for local hydrogen accumulation due to blowing: A strong blowing in aircraft aft direction can tear some locally accumulated hydrogen 4 and move it in aft direction (cf. FIG. 5 for example). As the hydrogen 4 tends to ascend quickly, the surplus of normal air caused by blowing will return by flowing back on a lower altitude (cf. recirculating air 22 in FIG. 5), while the hydrogen 4 will separate itself from the normal air and accumulate in form of a hydrogen cloud in the upper aft area of the aircraft 100. Therefore, the specific behavior of hydrogen 4 (especially its quick ascension) allows to accumulate and collect hydrogen 4 at dedicated rooms in the aircraft by controlled and directed blowing of normal air onto dedicated hydrogen accumulations.

Blowing can be generated easily by e.g. ventilators 6. Another opportunity can be to use a reservoir of air under higher pressure than its environment and drain off this pressured air through a jet or nozzle. For this the air conditioning and distribution system with its air outlets in the aircraft 100 can be used. Optionally, the ventilators 6, jets or nozzles used for blowing can have mechanisms to adjust the direction (e.g. by turning around one or more flexible rotation axis at their outlet side) and throughput (e.g. by steering the ventilator 6 and its speed or the valves or the flexible openings) of their air flow.

In case of hydrogen detection in a non-vented area, air blowing can be used to reduce hydrogen concentrations there. After a hydrogen sensor unit 1*a* in such an area registers hydrogen 4, it sends appropriate signals to the system control 2, which evaluates the received data and optionally initiates the start of one or more ventilators 6 with airflow directed into or proxy to the non-vented area. Depending on the determined hydrogen concentration and optional measurement data from further hydrogen sensor units 1*a* in or around the concerned area, the system control 2 can steer the power/speed of the ventilator(s) 6. If available, the system control 2 can use mechanisms at the ventilator(s) 6 to turn them in different directions or to swivel them to efficiently blow hydrogen 4 out of the area or replace hydrogen 4 with environmental air. After the hydrogen concentration in the affected area has fallen below a defined value, the system control 2 can then stop the concerned ventilator(s) 6 or reduce its/their speed.

Blowing can be used to move hydrogen 4 to a dedicated location and accumulate it there. This can be realized by the system control 2, which coordinates the steering and control of blowing machines (e.g. ventilators 6), based on the received measurements and result data from hydrogen sensor units 1a. By these, the system control 2 can shuffle hydrogen 4 in a coordinated way from a non-vented area to a vented area. Synchronized blowing of hydrogen 4 occurrences over several walled segments is also possible, i.e. the hydrogen 4 moves stepwise by consecutively arranged blowing machines from one walled segment to another segment. To get the hydrogen 4 finally overboard, the system control 2 directs the hydrogen 4 to vented places and steers there the opening of the inlets 3a (and optionally ventilator(s) 6 inside) and also its closure after venting becomes obsolete. The software of the system control 2 evaluates where hydrogen 4 at which concentrations is detected and conducts measurements (e.g. blowing, venting) which also can consider the given space geometries, risks and possible paths to vented areas.

Example 6

Low hydrogen occurrence in a first, non-vented area which contains potential ignition sources (e.g. electrical switches) and next to it high hydrogen occurrence in a second, non-vented area with no ignition sources, followed by a vented area. The vented area comprises a inlet 3a and a hydrogen sensor unit 1a under control of the system control 2. As a possible solution the system control 2 can determine and initiate here maximal blowing of all those ventilators 6 with their operating area enclosing the first area. The blowing directions of the ventilators 6 are adjusted in such a way that maximum air exchange in the first area takes place and its hydrogen 4 is blown in direction of the second area. The second area is used as hydrogen buffer and only one ventilator 6 with reduced speed (optional, e.g. to reduce undesired air backflow effects) ensures by its airflow path that surplus hydrogen 4 is directed from the second area to the vented area. If the hydrogen sensor unit 1a in the vented area indicates a hydrogen concentration above a certain limit, the system control 2 will initiate to open the inlet 3a (and optionally to start ventilator(s) 6 inside) to discharge accumulated hydrogen 4 over board.

Example 7

Assumed, forward lower deck bay in nose is equipped with critical electronics, also the cockpit above. In the middle of the aircraft 100 at wing root there are also some critical equipment and optionally hot pipes from e.g. bleed air ducts or fuel cell. Therefore, both areas comprise sources of ignition or fire and envelope essential flight apparatus. A venting inlet 3a may be installed in the upper shell roof in the middle between nose and wing.

Now a hydrogen sensor unit 1a indicates considerable hydrogen accumulation in the lower deck of the aircraft 100 somewhere between nose and center fuselage and sends the data to the system control 2. Based on the received data and the given geometry and risk areas the system control 2 derives the strategy to keep hydrogen dissipation away from the electronics in nose and to hinder furthermore that the hydrogen 4 later on climbs from lower deck nose upwards through the cockpit electronics.

On the other side, the system control 2 has to keep hydrogen 4 away from the wing root area with hot pipes. To reach both targets, the system control 2 initiates that ventilators 6 in nose lower deck are blowing in backward direction below cabin floor and the ventilators 6 in lower deck nearby the wing roots are blowing in forward direction below cabin floor. In consequence, hydrogen 4 accumulates somewhere between nose and center under the cabin floor and will climb there upwards through leakages in the floor or through insulation, decompression grids and other openings between floor and outer aircraft skin. The hydrogen 4 will then accumulate again in the crown area of the upper shell within the catchment area of the venting inlet 3a.

The hydrogen sensor unit 1a proxy to or as part of the venting element sends data to the system control 2. After hydrogen concentration has reached a certain limit, the system control 2 initiates to open the venting inlet 3a (and optionally starts ventilator(s) 6 inside) to discharge accumulated hydrogen 4 over board. After the hydrogen concentrations in lower deck and around the venting inlet 3a has decreased below a certain limit and stayed there for a certain time, the system control 2 stops the ventilators 6 in lower deck, closes the venting inlet 3a in upper deck and stops the respective ventilator(s) 6.

Cooperation of HACS with Other Systems:

The system control 2 may be communicatively coupled with and/or configured to control various other subsystems of the aircraft 100 comprising amongst others a cabin pressure control system 12, an aircraft door control and monitoring system 13, an oxygen system 14, an aircraft electric system 15 and a flight control system 16 in order to initiate and conduct the remedial procedure. All of these (sub) systems may be communicatively coupled with each other by data/power lines 19 and/or wireless connections 18.

Besides close and harmonized cooperation between the elements of the HACS 10 and by carrying out physical steering of sophisticated strategies by its system control 2, the effectivity and efficiency of the whole system to control hydrogen accumulations in the aircraft 100 can be further enhanced by making use of other systems in the aircraft 100.

Figure 4:
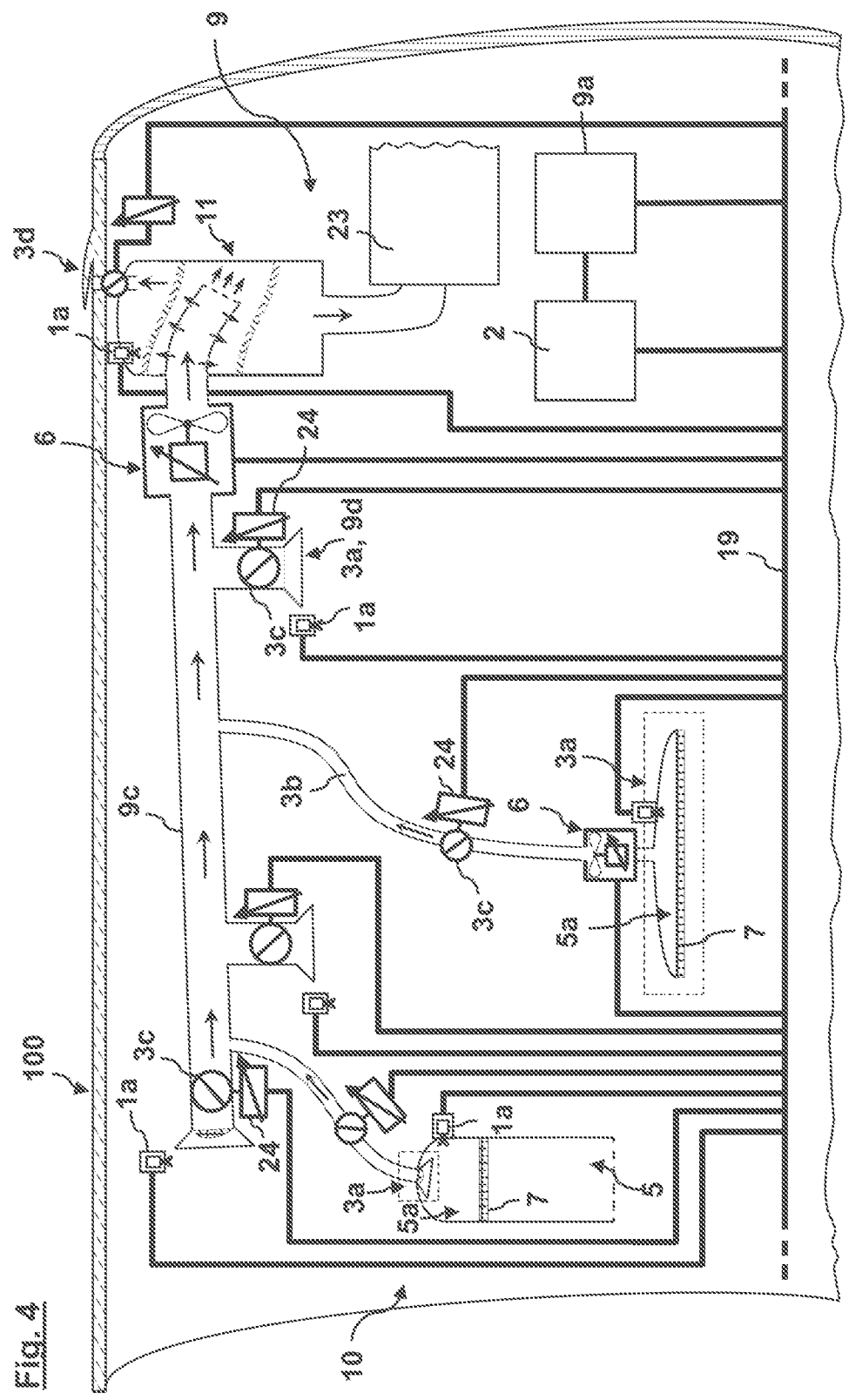
FIG. 4 shows another schematic sectional side view of an aircraft equipped with an embodiment of the system of FIG. 1.

Cooperation with the Air Conditioning System 9 (Cf. FIG. 4 in Particular):

The air conditioning system 9 in the aircraft 100 comprises, among other elements, a ductwork of air ducts 9c for air supply and distribution and a ductwork of air ducts 9c for air extraction. The supply and distribution system part can be used to move hydrogen accumulations by dedicated steering of its air outlets 9b (if possible, also with dedicated steering of their opening rate and blowing direction) and also the velocity and amount of the airflow through its outlets 9b by controlling the possibly available fans and ventilators inside the distribution ductwork. The air supply and distribution elements are managed by a control unit 9a, which is normally part of the air conditioning system 9.

To efficiently move hydrogen accumulations, which are in the reach of air outlets 9b from the air supply and distribution, a close interaction between its elements (mainly air outlets 9b and fans/ventilators in the distribution ductwork), the control unit 9a for the air conditioning system 9 and the HACS system control 2 is necessary. The utilization of elements from air supply and distribution to move hydrogen accumulation by air blowing through air outlets 9b works similar to the already described blowing mechanisms and strategies inside the HACS 10, taking also into account e.g. the given environment, space geometries and the location of vented areas in a comparable way.

The elements from air supply and distribution are normally triggered and steered by the control unit 9a of the air conditioning system 9. For hydrogen accumulation treatment, the HACS system control 2 is connected with the control unit 9a of the air conditioning system 9. This can be realized by e.g. direct connection or a network connection. By this the elements from air supply and distribution can be triggered and steered from the HACS system control 2 directly or via the air conditioning control unit 9a which receives messages and commands from the HACS 10. To reduce interfaces and coordination effort, the control units from HACS 10 and air conditioning 9 and also their networks can be integrated and merged into one common control unit and one common network to manage sensor data and data flows, to execute data evaluations and the steering and control of elements from the air conditioning system 9 and from the HACS 10.

The air extraction system part can be used to vent hydrogen accumulations. For this purpose, air intakes 9d of the air extraction system can be opened to suck air and hydrogen 4 into the air extraction ductwork. The amount of sucked hydrogen 4 can be increased by dedicated and controlled opening of only those air intakes 9d where hydrogen accumulations are in reach of their sucking area. In consequence, the use and consumption of the available under-pressure in the air extraction ductwork is focused on only those air intakes 9d with hydrogen 4 in front of. Elements as e.g. ventilators or turbines in the air extraction ductwork can increase the captured air flow inside and the available under-pressure which drives the air and hydrogen 4 sucking at the air intakes 9d.

In case of aircraft in flight at high altitude with given low ambient pressure outside the aircraft 100, under-pressure can furthermore be established and maintained in the extraction ductwork by a direct connection to the outboard environment of the aircraft 100 via e.g. an air outflow valve or air discharge opening. The elements of the air extraction system are triggered and steered in a similar way to the air distribution system 9, normally by the control unit of the air conditioning system 9 and via its network.

In case of hydrogen 4 sucked into the air extraction ductwork, the air conditioning system 9 has to ensure that this hydrogen 4 cannot cross over inside the air regeneration modules or an air mixer unit 23 into the air distribution system 9 and will then flow back into the aircraft 100 again. Here a gas separator 11 installed before the air extraction ductwork enters into an air generation equipment or an air mixer 23 can remove most of the hydrogen share of the extracted air flow.

Example 8

Hydrogen accumulation is detected by a sensor unit 1a of the HACS 10, appropriate data and messages are transferred from this sensor 1a via the HACS 10 network to the HACS system control 2, there evaluated and commands are calculated and sent to HACS ventilators 6 which are proxy to the hydrogen accumulation to start blowing and to adjust their blowing direction towards the hydrogen accumulation and in line with available venting elements of the HACS 10 which are in blowing direction behind the hydrogen cloud. Furthermore, the HACS system control 2 sends commands to the air conditioning control unit 9a which adopts or forwards received commands and/or checks and evaluates the received information and where the hydrogen accumulation is detected and calculates own strategies and measurements. Further, the air conditioning control unit 9a exchanges and negotiates them with the HACS system control 2. The air conditioning control unit 9a checks if the available air outlets 9b for air distribution can support the local air flow and the movement of the hydrogen 4 towards venting holes and if beneficial, to carry out appropriate commands to open and steer specific air outlets 9b and to ventilate their feeding ducts 9c.

In the same manner the air extraction system parts are controlled and steered by the air conditioning control unit 9a or the HACS system control 2 to efficiently support venting by opening only those air extraction venting holes with their sucking area inside the accumulated hydrogen 4 and by starting and controlling of the appropriate ventilators in the extraction ducts 9c behind. Furthermore, the available negative pressure in the extraction ductwork can be increased by dedicatedly closing all other air extraction venting holes which are not involved into hydrogen gas extraction via commands from the air conditioning control unit or the HACS system control 2.

In consequence, the coordinated physical activities between air conditioning system 9 and HACS 10 are leading to optimized control and utilization of the available system elements under consideration of their local installation places and capabilities: Electrical power is only used where necessary to enable hydrogen 4 removal (to open/close/ move air outlets 9b, air inlets 9d or venting elements and drive ventilators 6 of the HACS 10 or inside the air distribution or air extraction ductwork). This reduces also the risk for electric sparks. The strength of air blowing by the air distribution system 9 and the HACS 10 is concentrated and directed on areas with hydrogen 4. Due to the closure of the other air outlets 9b from air distribution, the whole pressure inside the distribution ductwork remains available to generate maximum air volume flow and air velocity at those air outlets 9b where hydrogen accumulation has to be moved. Only those air venting capabilities from HACS 10 and air extraction are open with hydrogen concentrations in reach of their sucking area. This maximizes the pressure difference between inside and outside the aircraft 100 respectively the under-pressure in the air extraction ductwork, resulting in maximum air venting for areas with hydrogen accumulation.

To achieve best efficiency for hydrogen 4 removal, dedicated design precautions for the air extraction, air distribution and the HACS 10 can be made in their architecture, layout and positioning of their system elements as follows:

Air extraction venting holes can be positioned in areas where hydrogen 4 can possibly accumulate. Good positions are e.g. inside the aircraft 100 directly below the roof in the middle between two frames or in the top area of other upwardly enclosed areas or of areas with low air exchange.

The required ductwork to connect those air extraction venting holes 9b may be preferably equipped with ventilators to reach the necessary air extraction flow rate high enough to get sucked virulent hydrogen 4 in the catchment area of its venting holes.

Starting from the venting holes, the ductwork of air extraction behind may be ascending, otherwise the hydrogen in the ductwork will flow back to the venting holes and inside the aircraft again after the ventilation inside air extraction stops. If an ascending duct installation is not possible, the velocity of the extracted air inside horizontal or descending duct segments may be kept on such a level that hydrogen inside is swept along with the ambient air extraction flow in the duct. This can be reached by installation of ventilators in the extraction ducts 9c with enough power and/or the use of the pressure drop from inside the aircraft 100 by e.g. a higher cabin pressure towards the outside of the aircraft 100 e.g. due to flying at higher altitude. Hydrogen sensors 1a inside the extraction ductwork, especially in horizontal or descending ducts or at their overboard discharge valve can give indication, if hydrogen 4 is still inside the extraction ductwork. In such a case the air conditioning control unit 9a can manage that air extraction continues until the hydrogen concentration inside the air extraction ductwork falls below a certain level.

Air outlets 9b from the air distribution can be positioned around or inside areas where hydrogen 4 can possibly accumulate. Beneficial positions inside the aircraft 100 are e.g. below its roof at or below the frame rims with blowing direction upwards to the middle roof surface between two frames or to the inner edge built by the opposite frame and roof. Air outlets 9b also can be positioned in the upper area of an enclosed volume as e.g. an area with hydrogen tank inside, a cabin area or an electronic bay, or directly below the aircraft roof to move hydrogen accumulations to the side or to accelerate it in such a way to blow it out of the enclosed area. Optionally, the air outlets 9b can be equipped with controllable ventilators and mechanisms to adjust their blowing opening and direction.

Cooperation with the Cabin Pressure Control System (CPCS) 12 (Cf. FIG. 5 in Particular):

Core components of the CPCS 12 in the aircraft usually comprise its outflow valves 12b, normally installed in the aft of the aircraft 100, e.g. in the rear pressure bulkhead. The CPCS 12 can have an own control unit to steer its elements, but can be also integrated and controlled via the general air conditioning system 9 and its control unit 9a. The CPCS outflow valves 12b can support essentially the HACS 10 by an appropriate opening or closing, depending on where and how much hydrogen occurs and which other system elements are available to support for hydrogen discharge procedure.

Besides the normal case during flight that cabin pressure is above the pressure outside the aircraft 100, in specific flight phases or situations the pressure in cabin can be below outside pressure. In such a situation the HACS system control 2 and the control for CPCS 12 and air conditioning first have to initiate appropriate measurements, which increase cabin pressure above outside pressure, e.g. by increasing the air flow through the air distribution system 9 into the cabin. Otherwise a discharge of hydrogen air from a pressurized area (e.g. cabin) through the venting elements of the HACS 10 or the CPCS outflow valves 12b to outside the aircraft 100 using only the available pressure difference would not work well.

Example 9

There are CPCS outflow valves 12b installed in the rear pressure bulkhead which are steered by the air conditioning control unit 9a. Direct in front of them a hydrogen accumulation is detected by a sensor unit 1a from the HACS 10. Appropriate data and messages are transferred from this sensor via the HACS network to the HACS system control 2, there evaluated and commands are calculated and sent to the air conditioning control unit 9a, which evaluates the data and commands, optionally determines own measurements, and then directly steers the CPCS outflow valves 9b to open or forwards them the command from the HACS to open.

In case the hydrogen accumulation is not or only partially in direct reach of the sucking area from the CPCS outlet valves 12b, the HACS system control 2 can trigger to start suitable ventilators 6 from the HACS 10 and adjust their blowing direction and power in such a way that the hydrogen accumulation moves towards the sucking area of the CPCS outlet valves 12b. In the same manner the air distribution system 9 can be employed by the CPCS 12 for blowing, if it is equipped with air outlets 9b which are positioned in an appropriate way to support the move of the hydrogen accumulation in desired direction. For this the air conditioning control unit 9a receives commands and data from the HACS system control 2. Based on these, the estimated dimension of the detected hydrogen cloud and the known three-dimensional space geometries in the aircraft 100, the air conditioning control unit 9a checks the possibilities of the available air distribution outlets 9b to generate an air flow, which is directed towards the hydrogen accumulation and further on towards the CPCS outlet valves 12b sucking area.

The air conditioning control unit 9a can also determine a strategy which indirectly supports the movement of the hydrogen cloud by generating air flows which replenish and pressurize surrounding areas and generate subsequently supporting air flows there to move or guide the hydrogen 4. Based on the calculated strategy, the air conditioning control unit 9a steers the opening and closing of its air outlets 9b and the ventilation of their feeding ducts 9c.

In case of further distance between the hydrogen accumulation and the CPCS outlet valves 12b sucking area, while no other ventilation from the HACS 10 or the air extraction system is nearby, a stepwise movement of the hydrogen cloud can be managed by close cooperation between the HACS 10 with its ventilators 6 and the air distribution system 9 with its air outlets 9b and inner ventilation. Dedicated and harmonized blowing by both systems will move the hydrogen cloud frame by frame towards rear pressure bulkhead and the CPCS outlet valves 13b.

In consequence, due to its steep climbing behavior, hydrogen 4 will accumulate in front of the rear pressure bulkhead with highest hydrogen concentration in air directly below the roof, diminishing downwards. In parallel, the normal air will separate from hydrogen 4, move downwards, to other directions and recirculate. If blowing would stop, the vertical form of the hydrogen cloud would quickly dissipate horizontally and in forward direction of the aircraft 100. Therefore, both systems need to continue with their steady blowing to maintain this instable situation. This ensures that the hydrogen 4 is steadily brought in front of the CPCS outlet valves 12b for discharge until the complete hydrogen cloud has passed them, otherwise the remaining hydrogen will flow back and dissipate in the aircraft 100 again.

Example 10

The CPCS outflow valves 12b in the rear pressure bulkhead are actually open to discharge a slight overpressure in the cabin caused by normal inflow of fresh air via the air distribution system 9 into the cabin. Now, a hydrogen accumulation is detected by a HACS sensor unit 1a inside the pressurized cabin in an area which is equipped with venting elements from the air extraction system or from the HACS 10. The sensor sends data and messages via the HACS network to the HACS system control 2, which forwards it to the air conditioning control unit 9a. The control units 9a evaluate the data and calculate a bundle of measurements to reduce the hydrogen 4. First, they steer those venting elements with their sucking area in reach of the hydrogen accumulation to become opened.

By raising the cabin pressure, the hydrogen discharge rate through these venting elements can be increased. For this the HACS 10 steers all its other venting elements which are outside the hydrogen accumulation area to close them or to keep them closed. The air conditioning control unit 9a initiates and steers in the same manner the closure of the air extraction venting holes 9b which are located beyond the hydrogen accumulation area. Furthermore, the air conditioning control unit 9a triggers and steers the air distribution system 9 to increase the air flow through the air distribution ductwork inside the cabin by opening its air outlets 9b, starting its ventilators inside the air distribution ductwork and runs up in general the air generation unit for additional new cabin air. This can be done by opening the air inlets from outside the aircraft 100, which are feeding the air generation unit, by increase of added bleed air and the use of available pressurized air.

The CPCS outflow valves 12b, which are steered by the air conditioning control unit 9a or the HACS system control 2 directly, receive the commands and steering to become closed and to maintain their closure. The CPCS 12 has to keep cabin pressure in a given range and has to ensure that no overpressure occurs due to passenger comfort, passenger safety and due to maximum allowed loads in the aircraft structure caused by cabin pressure. Therefore, it could be necessary to reopen some of the CPCS outflow valves 12b in case of raised cabin pressure which has reached certain limits during this procedure.

To utilize one or more CPCS outflow valves 12b for hydrogen discharge, their sucking area may be positioned in reach of a hydrogen accumulation. One possibility is to bring the hydrogen proxy to the outflow valve 12b. This can be achieved by ventilating and blowing of an air-hydrogen mix in direction to the CPCS outflow valves 12b, or by the design of appropriate surrounding partitions and three-dimensional shapes which will guide ascending hydrogen towards the CPCS outlet valves 12b.

Another possibility is to optimize the physical positioning of those CPCS outflow valves 12b, which are intended for hydrogen discharge. The behavior of hydrogen 4, which climbs upwards quickly inside the aircraft 100 until it is stopped by cavities or latest by the cabin ceiling/aircraft roof and the impact of ventilators 6 and air blowing, results in spatial areas inside the aircraft 100 where hydrogen 4 will accumulate. In case of a pressurized cabin, equipped with CPCS outflow valves 12b in the rear pressure bulkhead and available blowing and ventilating system elements to move hydrogen towards to the CPCS 12, hydrogen 4 will accumulate in front of the rear pressure bulkhead below aircraft roof. In consequence, the CPCS outlet valves 12b, which are foreseen for hydrogen discharge, may be positioned at the utmost top area of the rear pressure bulkhead. This allows to discharge hydrogen 4 immediately after a small spatial hydrogen accumulation occurs in front of the rear pressure bulkhead, without the need to wait while a hydrogen accumulation cloud has grown big enough from top of the cabin ceiling/aircraft roof downwards until it has reached a CPCS outlet valve 12b at a lower position, e.g. in the middle of the rear pressure bulkhead.

Due to the interplay between CPCS outflow valves 12b, given geometries and active ventilation and blowing, hydrogen 4 tends to accumulate in dedicated areas. To eliminate the risk of hydrogen ignition or explosion, these areas may be designed as stay out zones for potential ignition sources. There the installation of e.g. pipework or storage elements for oxygen or hydraulics, hot air pipes or non-shielded electric wires and electric equipment may be banned.

Further, all CPCS outflow valves 12b may be managed by the HACS system control 2 or the air conditioning system control unit 9a in such a way that in case of hydrogen discharge, only those CPCS outlet valves 12b are opened which are involved in hydrogen discharge while the other CPCS outlet valves 12b become closed or at least partially closed. This improves the available pressure difference between aircraft cabin and environment outside the aircraft 100 and therefore increases the discharge flow through those CPCS outlet valves 12b which are effective for hydrogen discharge, while the other outlet valves 12b are not or less lowering the inner aircraft pressure.

Figure 6:
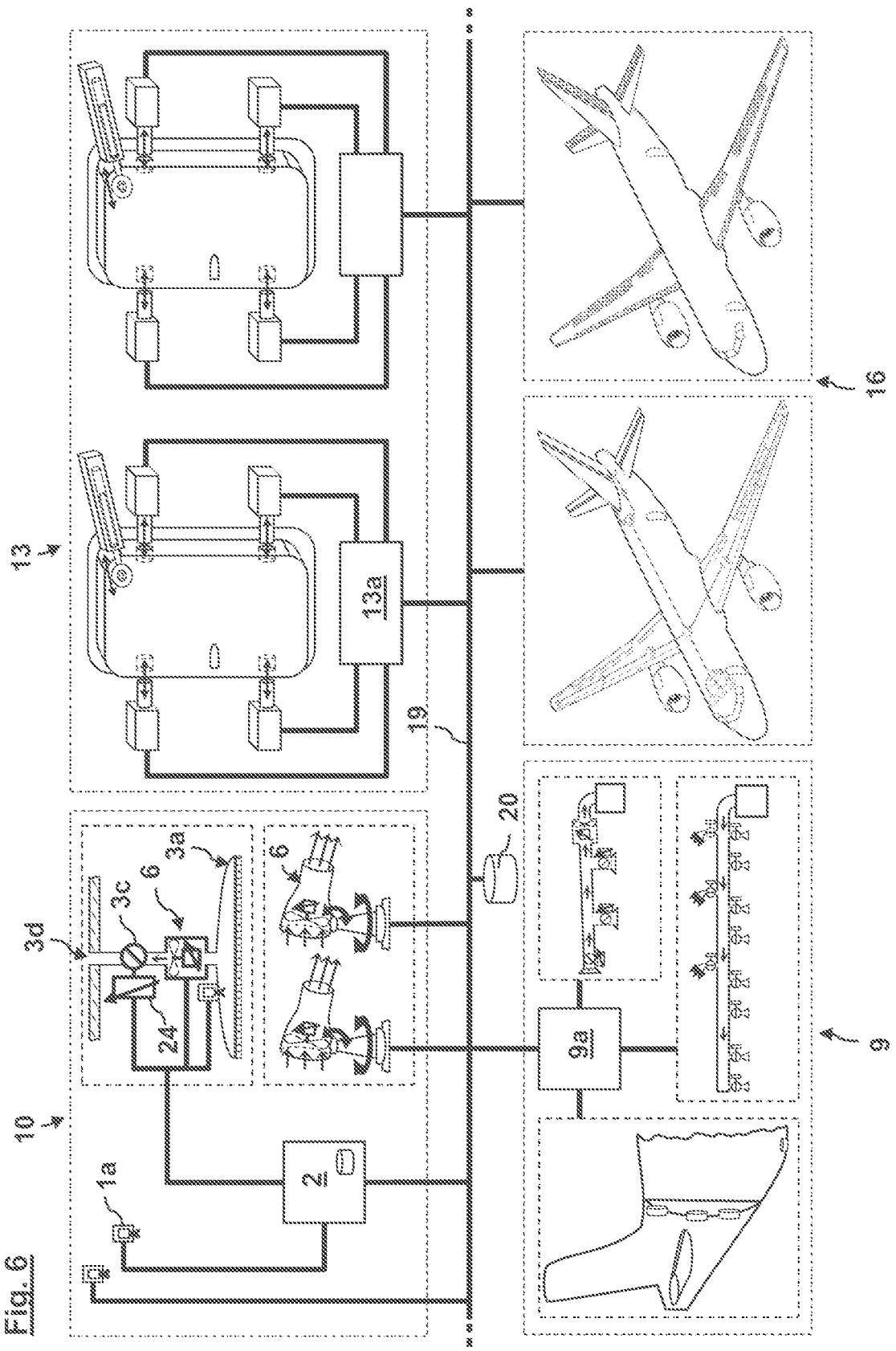
FIG. 6 is schematic view of subsystems of an aircraft equipped with an embodiment of the system of FIG. 1.

Cooperation with the Door Control and Monitoring System (DCMS) 13 (Cf. FIG. 6 in Particular):

In specific cases it could be sensible to open one or more aircraft exterior coverings (closable and lockable, e.g. doors, hatches or slides) during flight or on ground. A possible application for this is the massive occurrence of hydrogen 4 in certain areas of the aircraft 100, which cannot be reduced quick enough by the HACS 10 and the other available aircraft systems.

During flight, the HACS 10 and the DCMS 13 may balance dedicatedly if and which closable/lockable exterior coverings (e.g. hatches, doors) to be opened in exceptional cases. This is mainly depending on the location, amount and incline of free hydrogen 4 inside the aircraft 100, the actual explosion risk, actual aircraft speed, flight altitude, and if in pressurized area, the impact of the hydrogen concentration on respiratory air for passengers and crew, availability of oxygen for passengers by the oxygen system and if they can cope with the outside pressure.

After hydrogen sensor units 1a from the HACS 10 have detected hydrogen 4, they will send this information via network to the HACS system control 2, which evaluates the received data. In case the data indicate a hydrogen concentration, incline or amount above a defined level, the HACS system control 2 starts to communicate with the DCMS control unit 13a and requests for cooperation. Based on supplementary parameters from inside and around the aircraft (e.g. aircraft speed, flight altitude, explosion risk level) the HACS 10 and/or the DCMS control unit 13a can decide to open one or more exterior openings. This will probably require additional communication in advance with further systems in the aircraft 100 as e.g. the flight management system (here, besides flight planning calculations, with focus on functions with direct system impact as e.g. diversion aid, take off securing, navigation, vertical flight profile management, connections to autopilot) to receive from such systems also the permission to open doors.

If this is the case and e.g. a door should be opened from a pressurized area, the DCMS 13 communicates via network with the HACS system control 2 and the control unit(s) 9a for CPCS 12 and air conditioning system 9 to initiate by them that cabin pressure becomes adjusted on the level of pressure outside the aircraft 100. With reduced pressure difference between inside and outside of the doors, the forces induced by air pressure on the doors are reduced, which makes the opening of the doors easier.

In the next step the DCMS control unit 13a triggers and steers the release of the e.g. door/hatch/slide latching devices and then starts the actuators for opening of the concerned door/hatch/slide. Now exterior air can enter the openings at high air speeds, causing massive turbulences which can drag hydrogen 4, especially with openings open in front and aft of the aircraft 100, allowing to air through the appropriate area. The hydrogen sensor units 1a measure and send data continuously to the HACS system control 2 and further to the DCMS control unit 13a. After hydrogen measurement data reach uncritical levels again, the DCMS control unit 13a initiates and steers the closing of the appropriate exterior openings.

For aircraft on ground the chain of command and involved system elements is similar: Detection of hydrogen 4 by hydrogen sensor units 1a, from there data transfer via network to the HACS system control 2, which evaluates and calculates measurements, from there data and commands via network to the DCMS control unit 13a, which evaluates, initiates and steers the exterior door/hatch/slide opening and closure.

Depending on the level of detected hydrogen and actual aircraft state (passengers on board or not, only few persons in the aircraft 100 e.g. for maintenance, empty aircraft), the DCMS control unit 13a initiates appropriate actions. In case only few hydrogen 4 is detected, which can be discharged by the available aircraft systems, the DCMS control unit 13a can initiate and steer to keep the exterior openings closed or to close open exterior openings (it is advisable that the HACS indication units 17a at least inform the persons on board before and give them time to leave the aircraft).

In parallel the HACS 10 calculates and initiates procedures to vent specific areas and to discharge hydrogen 4 by itself and in cooperation with support by other aircraft systems (for pressurized areas mainly CPCS 13 and air conditioning system 9 to increase the internal cabin pressure).

In case of aircraft on the ground with a detected amount of hydrogen 4 which will not be manageable by the available aircraft systems alone, the DCMS control unit 13a can initiate and steer the release of the door/hatch/slide latching devices and starts the motors to open the exterior doors/hatches/slides.

In case of a pressurized area, there is now the same pressure inside and outside the aircraft 100. This means that no driving pressure difference is available which automatically presses air-hydrogen mixtures through open air outlet valves, venting elements etc. for discharge over board. Furthermore, the open doors/hatches/slides will compensate immediately a possible pressure increase inside the aircraft 100.

In consequence, air and hydrogen movement and extraction can be supported by forced airflows. For this the HACS system control 2 initiates appropriate activities as e.g. starting HACS ventilators 6 to induce directed air flow e.g. towards the open doors/hatches/slides. For hydrogen-air extraction via the HACS venting elements, the ventilators 6 inside the venting system 3 are started and generate an artificial pressure difference and airflow. In case of pressurized areas, in similar manner the air conditioning control unit 9a starts the ventilators inside the air extraction ductwork to generate under-pressure and sucking airflow at their air inlets. All these activities as e.g. directed air blowing or air extraction to support hydrogen discharge or to move hydrogen accumulations out of open doors/hatches/slides are initiated in close coordination and feedback loops between the control units from DCMS 13, HACS 10, CPCS 12 and air conditioning system 9.

Figure 7:
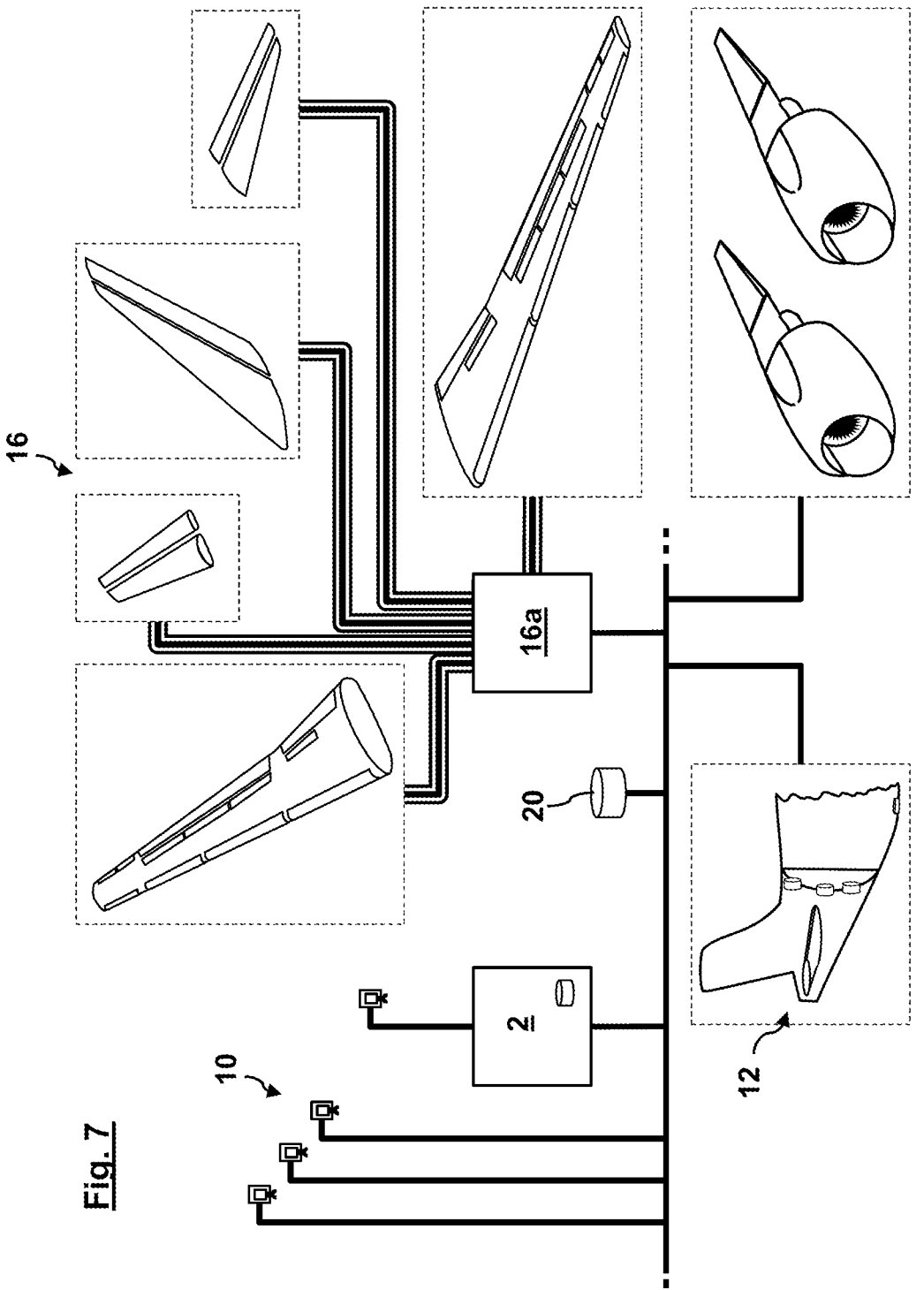
FIG. 7 shows another schematic sectional side view of an aircraft equipped with an embodiment of the system of FIG. 1.

Cooperation with the Flight Control System (FCS) 16 (Cf. FIG. 7 in Particular):

The very low specific weight of hydrogen 4 results in a steep climb rate of hydrogen 4 and the accumulation of hydrogen 4 into the highest possible areas it can reach inside the aircraft 100. This physical behavior can be used to move and to accumulate hydrogen 4 by turning the aircraft 100 around its longitudinal and transverse axis.

Turning the aircraft 100 around its longitudinal axis, i.e. one wing side goes up and the opposite one goes down, enables that hydrogen 4, which is locked locally in upwardly enclosed volumes, now can escape and climb further upwards.

Turning the aircraft 100 around its transverse axis means the aircraft nose goes up/down while the aircraft aft goes down/up. This approach can quickly move and concentrate higher amounts of hydrogen accumulations along the aircraft 100: If the ceiling area is ascending in direction to the nose versus horizontal, hydrogen inside e.g. the cabin tube will move, i.e. climb upwards and accumulate towards the cockpit. Vice versa, with an ascending ceiling in aft direction versus horizontal, hydrogen 4 will move and accumulate in the aft and at the end in front of the rear pressure bulkhead, in case no obstacles are between.

Such a movement of hydrogen accumulation works in similar way in other areas of the aircraft 100, e.g. in a non-pressurized area with a hydrogen tank installed inside or crossing hydrogen pipework.

After hydrogen sensor units 1a from the HACS 10 detect hydrogen 4 during flight, appropriate data are transferred from them via network to the HACS system control 2 and there evaluated. As possible outcome the data evaluation can demonstrate that it would be beneficial to cooperate with the flight control system 16, e.g. due to the location of the found hydrogen accumulation or its amount. Then dedicated data and parameters for evaluation, messages and commands about flight status, altitude, criticality due to detected hydrogen 4 etc. are exchanged between the control units 2, 16a of both systems. At the end, the master of the two control units 2, 16a may calculate and determine if to involve flight controls or not. In case of decision for involvement, the master control unit steers the flight control system 16 with its elements via the available network connections between. For this, it initiates and controls mainly the aircraft engines and the actuators to adjust the elevators, ailerons and rudders, especially to turn the aircraft 100 around its longitudinal and transverse axis for a certain amount of time.

For example, after a high amount of hydrogen 4 has been detected by hydrogen sensor units 1a from the HACS 10 in the forward cabin area, the master control unit of the HACS 10 and the flight control system 16 decides to involve the flight control system 16 and initiate a downwards inclination of the aircraft 100 by steering the actuators for the elevator rudders to be turned appropriately. In consequence, the aircraft 100 goes in descent with the result that the highest point in cabin versus horizontal reference is now in cabin aft area. The hydrogen accumulation moves, i.e. climbs, now in the rear cabin and accumulates in front of the rear pressure bulkhead and some CPCS outlet valves 12b. Communication and commands from the HACS system control 2 to the CPCS control unit triggers the opening of these outlet valves 12b to discharge this hydrogen accumulation overboard.

After the hydrogen accumulation is discharged or the hydrogen concentration is reduced down to a certain level, the CPCS outlet valves 12b are steered to become closed via network by the HACS system control 2 and/or the CPCS control unit. Afterwards, the flight maneuver is stopped, based on evaluation of data about e.g. flight status and gas detection and by calculated decisions and commands from the master control unit of the HACS 10 and the flight control system 16. In consequence, the flight control system 16 steers and adjusts its actuators, rudders, engines etc. to follow the initial flight path again or a new flight path.

Figure 8:
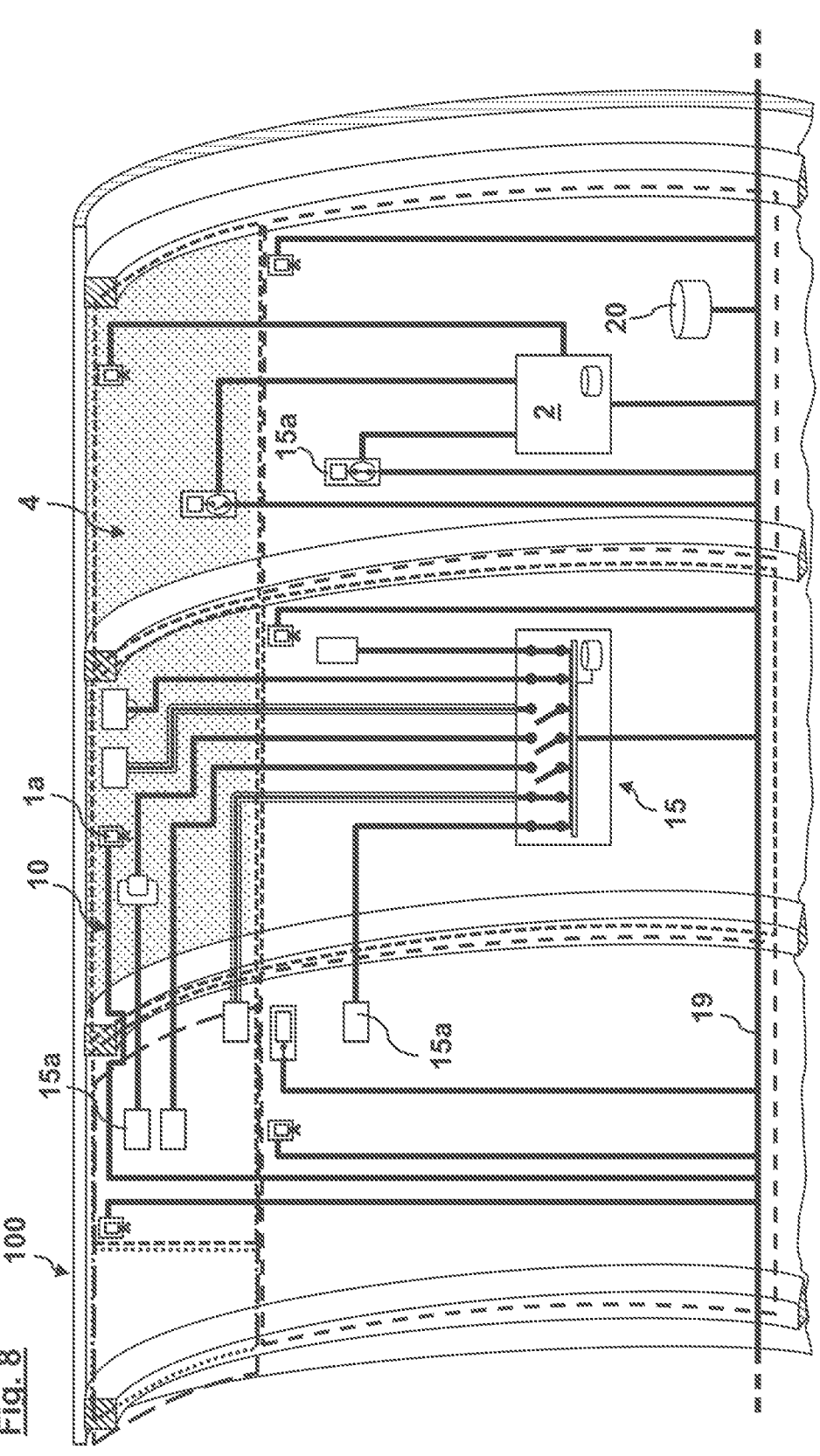
FIG. 8 shows another schematic sectional side view of an aircraft equipped with an embodiment of the system of FIG. 1.

Cooperation with the Aircraft Electric System 15 (Cf. FIG. 8 in Particular):

Electric system elements 15a of the electric control system 15 carry the potential of being the causality for short circuits, hot spots and ignition sources mostly due to sparks e.g. in corroded connections, electric arcs in switches and short circuits or electrostatic discharge. Their installation close to a hydrogen accumulation means an increased risk for an uncontrolled deflagration or explosion.

Such risks can be avoided by application of installation design rules, as e.g. the concept of stay out zones with installation of electric elements 15a only outside of areas where hydrogen accumulation can occur. Another design precaution is the gas tight encapsulation of electric elements 15a in such areas that hot spots, sparks etc. by the electric elements have no direct contact to the hydrogen 4 around.

Besides, the potential hazard caused by electric elements 15a proxy to hydrogen 4 can be managed by a close cooperation between the HACS 10 and the concerned electric elements 15a. For this the HACS 10 measures with its hydrogen sensor units 1a the occurrence and concentration of hydrogen accumulation and calculates its dimension and into which areas and zones of the aircraft 100 it actually extends or will move to at which concentration level.

There may be a database 20 integrated in the HACS system control 2, which states with data records about electric system elements 15a their location (e.g. aircraft zone as granularity) and potential risk versus an occurring hydrogen concentration. This also can include the passages of the electric lines. The database 20 may also physically be located outside the HACS system control 2, as long as the HACS system control 2 has at least access to the database via direct connection or network. Other possible architectures are, that the control unit of the aircraft electric system 15 has access to this database 20 or the distributed critical electric system elements 15a themselves have such information stored in their dedicated local control units.

Based on the information received from the hydrogen sensor units 1a, the calculated and predicted hydrogen distribution and concentrations in aircraft zones and their mapping with the information from the database, the HACS system control 2 can initiate physical countermeasures to reduce the risk caused by hydrogen 4. Apart from venting and blowing, the HACS system control 2 can steer specifically the electrical shut-off for dedicated electrical system elements 15a. For this the HACS system control 2 sends appropriate commands via network to e.g. electrical power distribution boxes, network-controlled switches, circuit breakers, transistors, transformers or relays to shut-off or disconnect the electric element. Furthermore, the HACS system control 2 can block the switch-on of electric system elements 15a in similar way.

In case hydrogen 4 is disappearing, the hydrogen sensor units 1a of the HACS 10 may indicate a reduced hydrogen concentration. When the calculations of the HACS system control 2 show a bearable risk for dedicated areas, the electric system elements 15a located there can be switched-on again. For this the HACS system control 2 can send appropriate commands via network to the concerned electric elements 15a or steering units, which then control and steer the switch-on or unblocking of the corresponding electrical system elements 15a.

Decision making and steering for switch-off/-on/blocking of electric system elements 15a can be also implemented in a more collaborative or distributed system architecture. Here the hydrogen sensors of the HACS 10 may send their data to the HACS system control 2, which processes the data and optionally make aggregations and calculations, e.g. about hydrogen concentrations and risk per area. These data are then distributed via network to common available databases and to control units of electrical system elements 15a or the electric system elements 15a directly. The communication between the participants can be triggered e.g. as broadcast on occurrence, periodically or on request from the electric system elements 15a.

Figure 9:
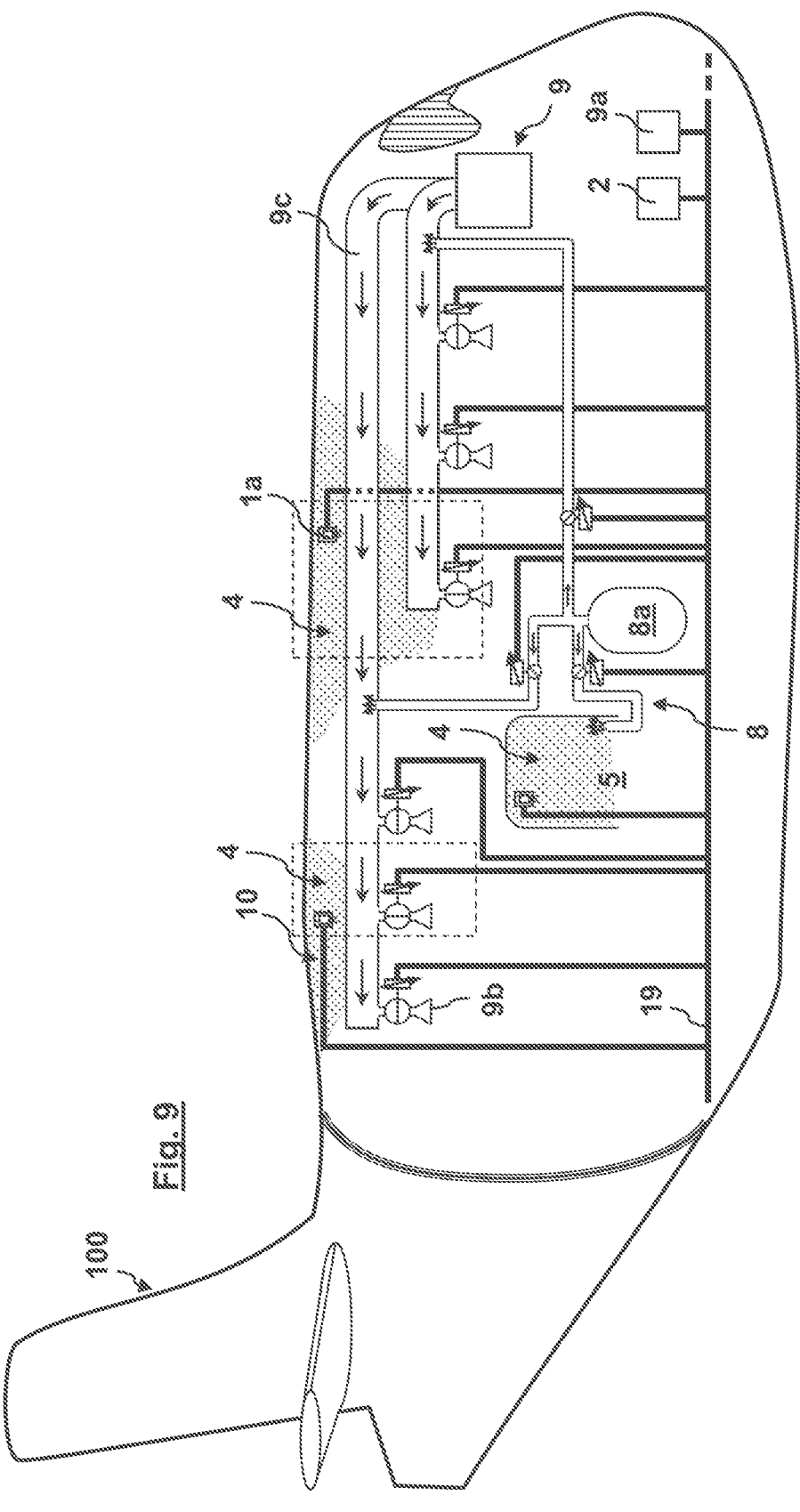
FIG. 9 shows another schematic sectional side view of an aircraft equipped with an embodiment of the system of FIG. 1.

Utilization of Inert Gas (Cf. FIG. 9 in Particular):

The system control may further control an inert gas system 8 to make use of an inert gas stored in an inert gas reservoir 8a, in particular helium, in case of a hydrogen leak to release the inert gas from the inert gas reservoir 8a as part of the remedial procedure such that the inert gas is mixed with the hydrogen 4 within the interior space 5.

When hydrogen 4 is mixed with inert gas, its necessary energy for ignition increases and the risk of explosion or deflagration is reduced or is not possible anymore. As inert gas mainly helium can be applied, which is only slightly heavier and can maintain a hydrogen-helium gas mixture for some time. The HACS 10 may be equipped with a reservoir 8a of inert gas, e.g. realized by a pressure cylinder for compressed inert gas or an insulated bottle for liquefied inert gas at cryogen temperature. The reservoir 8a may have one or more outlets with one or more controllable outflow valves, which can steer their opening and therefore the throughput of their outflow. The valves may be optionally lengthened by tubes which direct the inert gas to the desired areas where e.g. no venting is possible or an ignition risk needs to be reduced quickly.

The reservoir 8a or its tubes also can be connected via a junction to tubes of the air distribution system 9. The appropriate air distribution tube then captures and transports the inflowing inert gas to its air outlets together with the help of the current airflow inside. The usage of the available air distribution ductwork extends the range of reachable areas in the aircraft 100 for the inert gas system elements. In case of several connections from the inert gas reservoir 8a to different air distribution ducts, steering of the inert gas outflow valves can adjust in which of the air distribution ducts the inert gas is injected and how much. This allows to steer specifically to which areas of the aircraft 100 the inert gas will be transported later on. The efficiency of inert gas transport inside the air distribution ductwork can be supported by appropriate steering of the control unit 9a from the air extraction system, which adjusts the amount and velocity of the airflow and also opens or closes its air outlets 9b inside the air distribution ductwork. Especially the air outlets of an air distribution duct after the junction with an inert gas pipe, which actually injects inert gas, are then steered to become closed, while only those air outlets 9b are opened or kept open with outflow into the intended area. This hinders that the inert gas will leave the air distribution ductwork in advance of having reached its destined outlet(s).

After detection of a hydrogen gas accumulation by a hydrogen sensor unit 1a of the HACS 10, appropriate data are transferred from the sensor via network to the HACS system control 2 and are there evaluated. The evaluation result can indicate the necessity to apply inert gas in a specific area. In such a case the HACS system control 2 may send commands to initiate and steer the opening of dedicated valves connected to the inert gas reservoir 8a. Depending on the area where inert gas is needed, those valves are opened which enable the transport of the inert gas to the aimed area, either by direct tube connection or via the air distribution ductwork. In case of using the air distribution ductwork, the HACS system control 2 may send appropriate data and commands to the control unit 9a of the air distribution system 9, which transfers it in dedicated actions to open and close specific valves.

After the HACS system control 2 decides to stop the outflow of inert gas, it sends appropriate messages and commands via network which initiate and steer the closure of the inert gas outflow valves. Reasons for closure can be e.g. new data from HACS hydrogen sensor units 1*a* indicating an uncritical level of hydrogen or the strategy of the HACS system control 2 to only trigger single shots of inert gas with a limited amount to restrict the consumption of inert gas.

Figure 10:
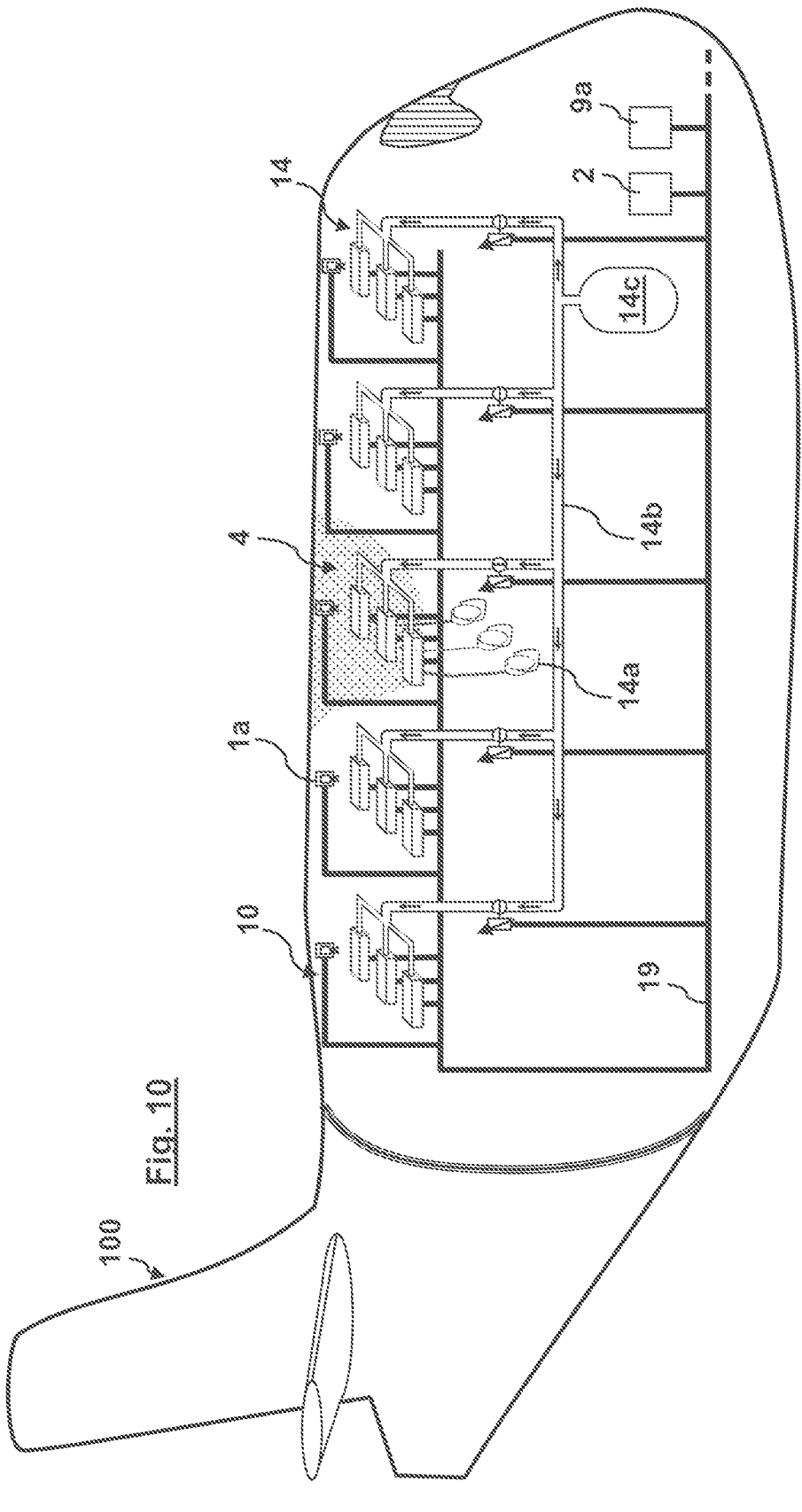
FIG. 10 is schematic view of subsystems of an aircraft equipped with an embodiment of the system of FIG. 1.

Cooperation with the Oxygen System 14 (Cf. FIG. 10 in Particular):

In areas with high hydrogen concentrations the available oxygen in ambient air becomes edged out by the hydrogen 4. As hydrogen 4 is not visible and without smell, persons entering such an area may not recognize the situation.

This can be avoided by indicating the hydrogen concentration and associated risk for such impacted areas. If gas sensor units 1*a* of the HACS 10 detect hydrogen 4 or lack of oxygen, data about location and concentration of hydrogen 4 and/or oxygen are transferred via network to the HACS system control 2. The HACS system control 2 evaluates the data and determines if a critical level is reached and indication measures need to be initiated.

In such a case, the HACS system control 2 sends messages and commands about what and how to indicate in direct connection or via network to the appropriate indication units 17*a*, which are located in those areas where a critical hydrogen concentration has to be indicated. For steering and selection of dedicated indication units 17*a*, the HACS system control 2 can be supported by using a database 20 which stores the areas/locations of installed indication units 17*a* and gas sensor units 1*a*.

Besides a fixed installation, such an indication unit 17*a* may also be integrated in a mobile device, which optionally indicates in dependence of its actual geographic position in relation to a critical area with its distance and direction.

The indication unit 17*a* can notify the received data and give warnings in form of a message or symbol on a display. Furthermore, it optionally can switch on its warning lights, its loudspeakers to generate acoustic signals or its vibrating alarm to generate haptic warnings. In addition, the indication unit 17*a* can show the areas of the aircraft 100 with dedicated information per zone about hydrogen impact and risk level and if the zone is e.g. forbidden to enter without special breathing equipment.

When the HACS system control 2 decides to stop the indication, it sends appropriate messages and commands via network to the indication units 17*a* to switch-off the optical, acoustic and haptic indications.

The HACS 10 can also collaborate with the oxygen system 14 to support a safe supply for oxygen. For this the gas sensor units 1*a* and optionally oxygen sensors detect locations and concentrations of hydrogen 4 and oxygen in the aircraft 100. The HACS system control 2 determines in which areas there is lack of oxygen for passengers and crew, i.e. the oxygen concentration is below a healthy level for breathing. The HACS system control 2 and/or the control unit of the oxygen system 14 are matching the locations of low oxygen areas with the positions of available oxygen masks and where crew, maintenance personnel and passengers are located or seated. The HACS 10 may then trigger the oxygen system 14 to open and release dedicated oxygen masks 14*a* in those areas with oxygen concentration below a critical level in the aircraft 100 by opening their mask boxes and by starting their corresponding oxygen generation. Depending on system design, oxygen generation is done by starting a chemical process or by opening appropriate valves between oxygen reservoir 14*c* and the relevant masks. Further, the opening of mask boxes and oxygen generation can be combined with the information of a seat/person recognition system to make masks only available at places with persons.

Besides an application of the HACS 10 inside the aircraft 100 in pressurized areas, parts of the HACS 10 can also be installed to discharge hydrogen accumulation in a similar way in other areas of an aircraft 100, as e.g. in the cavities where the hydrogen tanks are installed, in unpressurized spaces as the rear fuselage behind pressure bulkhead, in wings, nacelles, nose, avionics bay or other bays.

It is to be understood that the system can also be used for other types of gas (e.g. toxic, flammable or bio-hazardous ones) in a similar way to measure and reduce their concentration.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the disclosure herein and its practical applications, to thereby enable others skilled in the art to best utilize the disclosure herein and various embodiments with various modifications as are suited to the particular use contemplated.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 hydrogen detection system
1*a* sensor unit
2 system control
3 venting system
3*a* hydrogen inlet
3*b* transfer duct
3*c* flow control valve
3*d* hydrogen outlet
3*e* hydrogen flashback arrestor
4 hydrogen
5 interior space
5*a* accumulation portion
6 ventilator
7 unidirectional diaphragm
8 inert gas system
8*a* inert gas reservoir
9 air conditioning/distribution system
9*a* air conditioning control unit 9b air outlet
9c air duct
9d air inlet
10 hydrogen accumulation control system
11 hydrogen gas separator
12 cabin pressure control system
12a cabin pressure control inflow valve
12b cabin pressure control outflow valve
13 aircraft door control and monitoring system
13a aircraft door control unit
14 oxygen system
14a oxygen mask
14b oxygen line
14c oxygen reservoir
15 aircraft electric system
15a electric element
16 flight control system
16a flight control system control unit
17 indication system
17a indication unit
18 wireless connection
19 data/power line
20 system database
21 structural component
22 recirculating air
23 air mixer unit
24 valve control
100 aircraft

The invention claimed is:

1. A hydrogen accumulation control system for monitoring and controlling leaked hydrogen within an interior space, the hydrogen accumulation control system comprising:

a hydrogen detection system installed within the interior space and configured to detect a presence of hydrogen in the interior space and to provide occurrence data on the presence of the hydrogen detected in the interior space;

a system control configured to assess the occurrence data and to determine and initiate a remedial procedure for reduction of the hydrogen detected within the interior space; and a venting system configured to vent the hydrogen from the interior space according to the remedial procedure;

wherein the interior space comprises an accumulation portion arranged and configured for hydrogen accumulation; and wherein the accumulation portion is separated from a rest of the interior space by a unidirectional diaphragm, or by a molecular sieve, allowing hydrogen to pass from the interior space into the accumulation portion but not from the accumulation portion back into the rest of the interior space.

2. The hydrogen accumulation control system according to claim 1, wherein the occurrence data characterize at least one of a distribution of the hydrogen detected in the interior space and a concentration of the hydrogen detected in the interior space.

3. The hydrogen accumulation control system according to claim 1, wherein the venting system comprises at least one ventilator configured to induce a directed air flow to achieve at least one of:

distribution of the hydrogen within the interior space;

reduction of a concentration of the hydrogen in the interior space; and discharge of the hydrogen from the interior space;

wherein the at least one ventilator is configured to steer the directed air flow such that the hydrogen accumulates in an upper portion of the interior space, from which the hydrogen can be discharged, by separation from the air transported with the directed air flow.

4. The hydrogen accumulation control system according to claim 1, wherein the venting system comprises at least one venting element from the group consisting of a hydrogen inlet, a transfer duct, a flow control valve, a hydrogen outlet, and a hydrogen flashback arrestor.

5. The hydrogen accumulation control system according to claim 1, wherein the accumulation portion comprises a ceiling portion.

6. The hydrogen accumulation control system according to claim 5, wherein the accumulation portion is a ceiling portion.

7. The hydrogen accumulation control system according to claim 1, wherein the accumulation portion is configured as a hydrogen inlet of the venting system.

8. The hydrogen accumulation control system according to claim 1, wherein the system control is configured to calculate accumulation and movement of the hydrogen based on the occurrence data and on geometrical data characterizing the interior space.

9. The hydrogen accumulation control system according to claim 8, wherein the system control is configured to evaluate and predict risk levels based on calculated hydrogen accumulation and movement, the risk levels being considered for the remedial procedure.

10. The hydrogen accumulation control system according to claim 1, further comprising an inert gas reservoir storing an inert gas, wherein the system control is configured to release the inert gas from the inert gas reservoir as part of the remedial procedure to mix the inert gas with the hydrogen in the interior space.

11. The hydrogen accumulation control system according to claim 10, wherein the inert gas is helium.

12. The hydrogen accumulation control system according to claim 1, wherein;

the venting system is part of and/or coupled to an air conditioning system; and the system control is configured to control the air conditioning system according to the remedial procedure, to transport the hydrogen at least through portions of the air conditioning system.

13. The hydrogen accumulation control system according to claim 12, wherein the air conditioning system comprises a hydrogen gas separator configured to separate the hydrogen from air transported through the air conditioning system.

14. The hydrogen accumulation control system according to claim 1, wherein the system control is communicatively coupled with and/or configured to control, in order to initiate and conduct the remedial procedure, at least one of a cabin pressure control system, an aircraft door control and monitoring system, an oxygen system, an aircraft electric system, and a flight control system.

15. The hydrogen accumulation control system according to claim 1, further comprising an indication system configured to indicate information about the occurrence data and/or the remedial procedure.

16. An aircraft having the hydrogen accumulation control system according to claim 1.

17. A hydrogen accumulation control system for monitoring and controlling leaked hydrogen within an interior space, the hydrogen accumulation control system comprising:

a hydrogen detection system installed within the interior space and configured to detect a presence of hydrogen in the interior space and to provide occurrence data on the presence of the hydrogen detected in the interior space;

a system control configured to assess the occurrence data and to determine and initiate a remedial procedure for reduction of the hydrogen detected within the interior space;

a venting system configured to vent the hydrogen from the interior space according to the remedial procedure; and an inert gas reservoir storing an inert gas, wherein the system control is configured to release the inert gas from the inert gas reservoir as part of the remedial procedure to mix the inert gas with the hydrogen in the interior space.

18. An aircraft having the hydrogen accumulation control system according to claim 17.

19. A hydrogen accumulation control system for monitoring and controlling leaked hydrogen within an interior space, the hydrogen accumulation control system comprising:

a hydrogen detection system installed within the interior space and configured to detect a presence of hydrogen in the interior space and to provide occurrence data on the presence of the hydrogen detected in the interior space;

a system control configured to assess the occurrence data and to determine and initiate a remedial procedure for reduction of the hydrogen detected within the interior space; and a venting system configured to vent the hydrogen from the interior space according to the remedial procedure;

wherein the venting system is part of and/or coupled to an air conditioning system;

wherein the system control is configured to control the air conditioning system according to the remedial procedure, to transport the hydrogen at least through portions of the air conditioning system; and wherein the air conditioning system comprises a hydrogen gas separator configured to separate the hydrogen from air transported through the air conditioning system.

20. An aircraft having the hydrogen accumulation control system according to claim 19.

* * * * *